US00RE35508E

United States Patent [19]

Lemke et al.

[11] E Patent Number: Re. 35,508

[45] Reissued Date of Patent: May 13, 1997

[54] PLUG TERMINATOR HAVING A GROUNDING MEMBER

[75] Inventors: Timothy A. Lemke, Carlisle; Richard A. Elco, Mechanicsburg; Timothy W. Houtz, Etters, all of Pa.

[73] Assignee: Berg Technology, Inc., Reno, Nev.

[21] Appl. No.: 352,380

[22] Filed: Dec. 8, 1994

Related U.S. Patent Documents

Reissue of:

[64] Patent No.: 5,169,324
Issued: Dec. 8, 1992
Appl. No.: 774,991
Filed: Oct. 11, 1991

U.S. Applications:

[60] Division of Ser. No. 609,941, Nov. 7, 1990, Pat. No. 5,057,028, which is a continuation-in-part of Ser. No. 460,856, Mar. 8, 1990, abandoned, filed as PCT/US89/02082 May 12, 1989, which is a continuation-in-part of Ser. No. 285,533, Dec. 16, 1988, abandoned, which is a continuation-in-part of Ser. No. 193,611, May 13, 1988, Pat. No. 4,824,383, which is a continuation-in-part of Ser. No. 91,002, Sep. 2, 1987, abandoned, which is a continuation-in-part of Ser. No. 932,921, Nov. 18, 1986, abandoned.

[51] Int. Cl.[6] ..... H01R 13/652

[52] U.S. Cl. ..... 439/101; 439/108; 439/607

[58] Field of Search ..... 439/92, 95, 101, 439/108, 79, 607–609, 636, 637, 686, 695, 701

[56] References Cited

U.S. PATENT DOCUMENTS

| | | | |
|---|---|---|---|
| 3,325,771 | 6/1967 | Ruehlemann et al. | 339/184 |
| 3,430,185 | 2/1969 | Sitzler et al. | 339/59 |
| 3,500,295 | 3/1970 | Faber et al. | 339/176 |
| 3,517,375 | 6/1970 | Mancini | 339/177 |
| 3,539,974 | 11/1970 | Berg | 339/157 |
| 3,601,772 | 8/1971 | Mancini | 339/156 R |
| 3,634,814 | 1/1972 | Inacker | 339/176 MP |
| 3,689,865 | 9/1972 | Pierini et al. | 339/17 L |
| 3,696,319 | 10/1972 | Olsson | 339/17 F |
| 3,697,933 | 10/1972 | Black et al. | 339/192 R |
| 3,710,303 | 1/1973 | Gallager, Jr. | 339/61 M |
| 3,732,529 | 5/1973 | Weisenburger | 339/192 R |
| 3,781,760 | 12/1973 | Mancini et al. | 339/59 M |
| 3,871,728 | 3/1975 | Goodman | 339/14 R |
| 3,894,784 | 7/1975 | Clewes | 339/156 R |
| 3,926,497 | 12/1975 | Elgenbrode | 339/91 R |
| 3,941,448 | 3/1976 | Evans | 339/176 MF |
| 4,092,058 | 5/1978 | Elgenbrode | 339/218 M |
| 4,094,564 | 6/1978 | Cacolici | 339/14 L |
| 4,109,986 | 8/1978 | Mouissie | 339/17 L |
| 4,166,667 | 9/1979 | Griffin | 339/176 MP |
| 4,174,877 | 11/1979 | Foederer | 339/97 P |
| 4,248,491 | 2/1981 | Mouissie | 339/17 F |
| 4,274,699 | 6/1981 | Keim | 339/176 MP |
| 4,331,370 | 5/1982 | Andrews et al. | 339/17 M |
| 4,368,939 | 1/1983 | Foederer | 339/59 M |
| 4,398,780 | 8/1983 | Novotny et al. | 339/49 R |
| 4,406,512 | 9/1983 | Schell | 339/177 R |
| 4,416,501 | 11/1983 | Fusselman et al. | 339/97 R |
| 4,420,201 | 12/1983 | Stephenson | 339/14 R |

(List continued on next page.)

FOREIGN PATENT DOCUMENTS

| | | |
|---|---|---|
| 0268441 | 5/1988 | European Pat. Off. . |
| 2334267 | 1/1977 | France . |
| 24 31 914 | 1/1975 | Germany . |
| 52-74883 | 6/1977 | Japan . |

OTHER PUBLICATIONS

"CX Interconnection System", Du Pont Electronics Publication (39 pages), Aug. 1989.

*Primary Examiner*—Gary F. Paumen
*Attorney, Agent, or Firm*—Woodcock Washburn Kurtz Mackiewicz & Norris

[57] ABSTRACT

A terminator for multiple electrical conductors has a forwardly projecting ground contact provided on the ground structure thereof. A corresponding receptacle has a die cast frame to which nosepieces are attached. Cantilevered contact elements extend from contact blocks and are received in windows provided in the nosepieces.

24 Claims, 14 Drawing Sheets

U.S. PATENT DOCUMENTS

| | | | |
|---|---|---|---|
| 4,448,467 | 5/1984 | Weidler | 339/17 LC |
| 4,451,099 | 5/1984 | Bricker, Jr. et al. | 339/14 R |
| 4,558,917 | 12/1985 | Kamono et al. | 339/143 R |
| 4,585,285 | 4/1986 | Martens | 339/17 LC |
| 4,585,288 | 4/1986 | Aikens | 339/75 MP |
| 4,592,612 | 6/1986 | Kikuta | 339/143 R |
| 4,601,527 | 7/1986 | Lemke | 339/14 R |
| 4,605,276 | 8/1986 | Hasircoglu | 339/176 MF |
| 4,616,893 | 10/1986 | Feldman | 339/14 R |
| 4,618,202 | 10/1986 | Libregts et al. | 339/99 R |
| 4,632,486 | 12/1986 | Hasircoglu | 339/99 R |
| 4,639,067 | 1/1987 | Kikuta | 339/143 R |
| 4,641,902 | 2/1987 | Fusselman | 339/91 R |
| 4,671,601 | 6/1987 | Lomecka | 439/404 |
| 4,687,267 | 8/1987 | Header et al. | 439/62 |
| 4,695,106 | 9/1987 | Feldman et al. | 439/83 |
| 4,707,040 | 11/1987 | Hansel, III | 439/510 |
| 4,731,031 | 3/1988 | Lemke | 439/76 |
| 4,747,787 | 5/1988 | Siwinski | 439/108 |
| 4,806,110 | 2/1989 | Lindeman | 439/108 |
| 4,824,383 | 4/1989 | Lemke | 439/108 |
| 4,824,384 | 4/1989 | Nicholas et al. | 439/108 |

PLUG TERMINATOR HAVING A GROUNDING MEMBER

Matter enclosed in heavy brackets [ ] appears in the original patent but forms no part of this reissue specification; matter printed in italics indicates the additions made by reissue.

CROSS-REFERENCE TO RELATED APPLICATIONS

This application is a division of copending application Ser. No. 07/609,941, filed Nov. 7, 1990, now U.S. Pat. No. 5,057,028, issued Oct. 15, 1991, which is a continuation-in-part of United States national stage application Ser. No. 07/460,856, filed Mar. 8, 1990 now abandoned, which derives priority from PCT application Ser. No. PCT/US89/02082, filed May 12, 1989, which is itself a continuation-in-part of U.S. application Ser. No. 07/285,533, filed Dec. 16, 1988, now abandoned, which is itself a continuation-in-part and includes subject matter divided from application Ser. No. 07/193,611, filed May 13, 1988, now U.S. Pat. No. 4,824,383, issued Apr. 25, 1989, which is itself a continuation-in-part of application Ser. No. 091,002, filed Sep. 2, 1987, now abandoned, which is itself a continuation-in-part of application Ser. No. 06/932,921, filed Nov. 18, 1986, now abandoned.

BACKGROUND OF THE INVENTION

1. Field of the Invention

The present invention relates to a plug terminator having electrical contacts therein, each contact being connectable to one of a multiplicity of electrical conductors, and in particular, to a terminator having a projecting ground structure therein arranged to isolate each electrical contact. In addition, the present invention relates to a receptacle structure useful with such plug terminator.

2. Description of the Prior Art

As the performance of electronic devices has increased exponentially it has become recognized in the art that the transmission of electrical signals, whether within a given electronic apparatus or between coupled apparatuses, must be approached from a system viewpoint. Such a viewpoint mandates that not only must each individual component in the signal transmission system be optimized for high speed operation, but also the interfaces between components in the transmission system must be able to perform interactively without degrading the performance of an adjacent component.

One of the first components in the signal transmission system to receive attention is the transmission cable itself. The realization has been made that the cable handling the high speed signals is the electrical equivalent of a transmission line in that it extends an electrically great distance with respect to the wavelength of the transmitted signals. This is true even though in most instances the cable extends only a physically short distance between components of a given apparatus or between cooperating apparatus.

The design of electrical cable has advanced to a point wherein the cable can be precisely engineered to exhibit predetermined electrical properties. Exemplary of such cable structure is the flat cable and the round cable respectively disclosed and claimed in U.S. Pat. No. 4,800,236 (Lemke), and in U.S. Pat. No. 4,920,234 (Lemke), both assigned to the assignee of the present invention. The cables disclosed in these last-mentioned patents include a corrugated ground structure which defines separate enclosed regions, or envelopes, which extend throughout the entire length of the cable. Each of the envelopes receives one or more ordinary jacketed conductors. When the ground structure is connected to a predetermined electrical potential the conductor in each envelope is isolated from those conductors disposed in adjacent envelopes. As a result such a cable exhibits electrical properties closely similar to those attainable from coaxial cable despite the fact that only ordinary jacketed conductors are utilized.

The system viewpoint has expanded to include considerations of electrical performance in the transition region intermediate the end of the cable and the cable terminator. The connector structure disclosed and claimed U.S. Pat. No. 4,731,031 (Lemke), assigned to the assignee of the present invention, utilizes a ground plane spaced predetermined distances from the ends of the conductors in the cable, from the contacts in the connector, and from the interconnection therebetween, for the purpose of minimizing electrical discontinuities in the system.

Density of the terminator, that is, the number of signals that can pass through a given terminator, is also an important consideration. In conventional systems attempts have been made to extend the shielding and control the impedance of the system beyond the transmission line by simply dedicating alternating contacts in the linear array of contacts in the terminator as ground contacts. The contact is not physically altered, but is merely designated as a ground contact and connected to a predetermined ground potential. The net result of these factors is that the density of the terminator is limited.

The plug terminator disclosed and claimed in U.S. Pat. No. 4,824,383 (Lemke), issued Apr. 25, 1989, extends the system concept to the individual terminator of the transmission system in a way that increases the density of the terminator. The terminator shown in this last mentioned patent is adapted for use with either a multiple conductor cable or a multiple tracing substrate and is thus adapted to interconnect in substrate-to-substrate, cable-to-cable, or cable-to-substrate form. This terminator includes structure that serves to electrically isolate individual or groups of contact elements in the terminator to prevent or to minimize cross talk between adjacent conductors and to prevent or minimize degradation of signal transmission. The isolating structure in the terminator is such that the contacts need not themselves be included as part of the isolating structure, whereby the signal density of the terminator may be increased.

The terminator includes a metallic ground structure which electrically isolates individual or groups of adjacent electrical contact elements disposed on or in a contact support member of the terminator. The ground structure has a baseplate with at least one wall that extends upwardly from a working surface of the baseplate. In the preferred case one or more walls also extend from the opposite working surface of the baseplate. The wall(s) define(s) a plurality of channels that extend in side-by-side relationship across the surface of the baseplate.

The insulated support member has a body portion with an array of extending fingers. The insulated support member is mounted on the baseplate with the fingers thereof extending into the channels on the baseplate. A single electrical contact element or a plurality of such contact elements is mounted on each of the fingers. In one arrangement the fingers may be provided with a recess in which an individual contact or a group of contacts is disposed.

The walls on the baseplate walls extend above the baseplate for a greater distance than do the electrical contacts. As a result, with the ground structure connected to a predetermined potential, each of the individual contacts or each group of contacts is electrically isolated from the adjacent contact or group of contacts, as the case may be, thus preventing or minimizing cross talk therebetween.

SUMMARY OF THE INVENTION

The present invention relates, in one aspect, to a receptacle for a plug terminator of the type disclosed in the above-referenced U.S. Pat. No. 4,824,383, that is, a terminator of the type having a metallic ground structure with a wall upstanding therefrom which defines a plurality of channels thereon. In this first aspect the receptacle comprises a housing, a contact block having a first and a second array of contact elements thereon received within the housing, and a frame having a central plate extending through the housing and the block. The central plate lies along a predetermined bisecting plane within the receptacle intermediate the first and the second arrays of contact elements. The receptacle is arranged to receive the terminator such that the leading edge of the ground structure thereof and the leading edge on the central plate lie within a predetermined close distance of each other. The forward edge of the ground structure is chamfered at a predetermined angle and the leading edge surface of the central plate is chamfered at a corresponding angle, so that the forward edge surface of the ground structure and the leading edge surface of the central plate lie parallel to each other.

The central plate is connectable to a predetermined electrical potential thereby to isolate the first and the second array of contact elements from each other. The frame further comprises a crossbar extending in parallel to the central plate. The crossbar has a ground contact thereon that is engageable with the wall on the ground structure when the terminator is received by the receptacle.

In one subsidiary aspect the crossbar has a blind opening therein, and the ground contact is press fit within the blind opening in the crossbar. Alternatively, the crossbar may have an opening, either in the form of a full bore or a slot, extending therethrough. The ground contact is a generally U-shaped member comprising a base portion with a pair of legs extending therefrom, the legs of the U-shaped member extending through the opening in the crossbar. The U-shaped member has a stiffener disposed between the base and each leg. The housing has standoffs thereon, the standoffs being engageable against the stiffeners to clamp the U-shaped member against a surface.

In a second major aspect, the present invention relates to a improved plug terminator arrangement. The plug terminator is generally similar to that discussed above, but improved in that at least one grounding contact, preferably connected to the baseplate of the terminator, projects forwardly past the forward edge of the metallic grounding structure. The ground contact has a planar portion with a tang offset therefrom while the central plate has a first and a second surface thereon and a recessed tongue formed therein. The recessed tongue is defined by a full groove extending across one surface of the plate and a partial groove defined across the other surface of the plate. The planar portion of the ground contact is receivable in the full groove and the forked clip is receivable in the partial groove, thereby to secure the ground contact to the baseplate.

In subsidiary aspects the terminator may have a latch disposed on a surface of at least one of the fingers thereof, and the baseplate has a notch sized to receive the latch, thereby to secure the finger to the baseplate. One of the walls of the terminator has a predetermined dimension and a finger has a slot therein, the slot being sized to closely accept the wall such that the finger is precisely located with respect to the baseplate. The one wall may also have a tapered guide portion thereon.

An improved receptacle, in accordance with still another major aspect of the invention, comprises a frame, preferably a die east metallic member, formed of an upper and lower crossbar connected at opposed ends by uprights. The frame has a central plate extending between the uprights in generally parallel relation to the crossbars. Each crossbar has a forward surface thereon. A nosepiece having a plurality of windows therein and formed of an insulating material is mounted to the forward surface of the crossbar, typically with an interference fit. A contact block comprising an insulating body member having a plurality of contact springs cantilevered therefrom is received, also preferably with an interference fit, into the frame, with the end of each of the contact springs being received within a window of the nosepiece and supported thereby. The nosepiece has a slot formed therein that is sized to closely accept the tapered guide portion of the terminator. The receptacle may include a ground contact connected to the central plate thereof, the ground contact having a planar portion with a forked clip offset therefrom. The central plate has a first and a second surface thereon, and a recessed tongue formed therein by a full groove extending across one surface of the plate and a partial groove defined across the other surface of the plate. The planar portion of the ground contact is receivable in the full groove and the forked clip is receivable in the partial groove, thereby to mount the ground contact to the central plate. When the terminator is received in the receptacle, the ground contact on the terminator is clamped between the ground contact and the central wall of the receptacle.

BRIEF DESCRIPTION OF THE DRAWINGS

The invention will be more fully understood from the following detailed description thereof, taken in connection with the accompanying drawings which form a part of this application and in which.

DETAILED DESCRIPTION OF THE INVENTION

Figure 1:
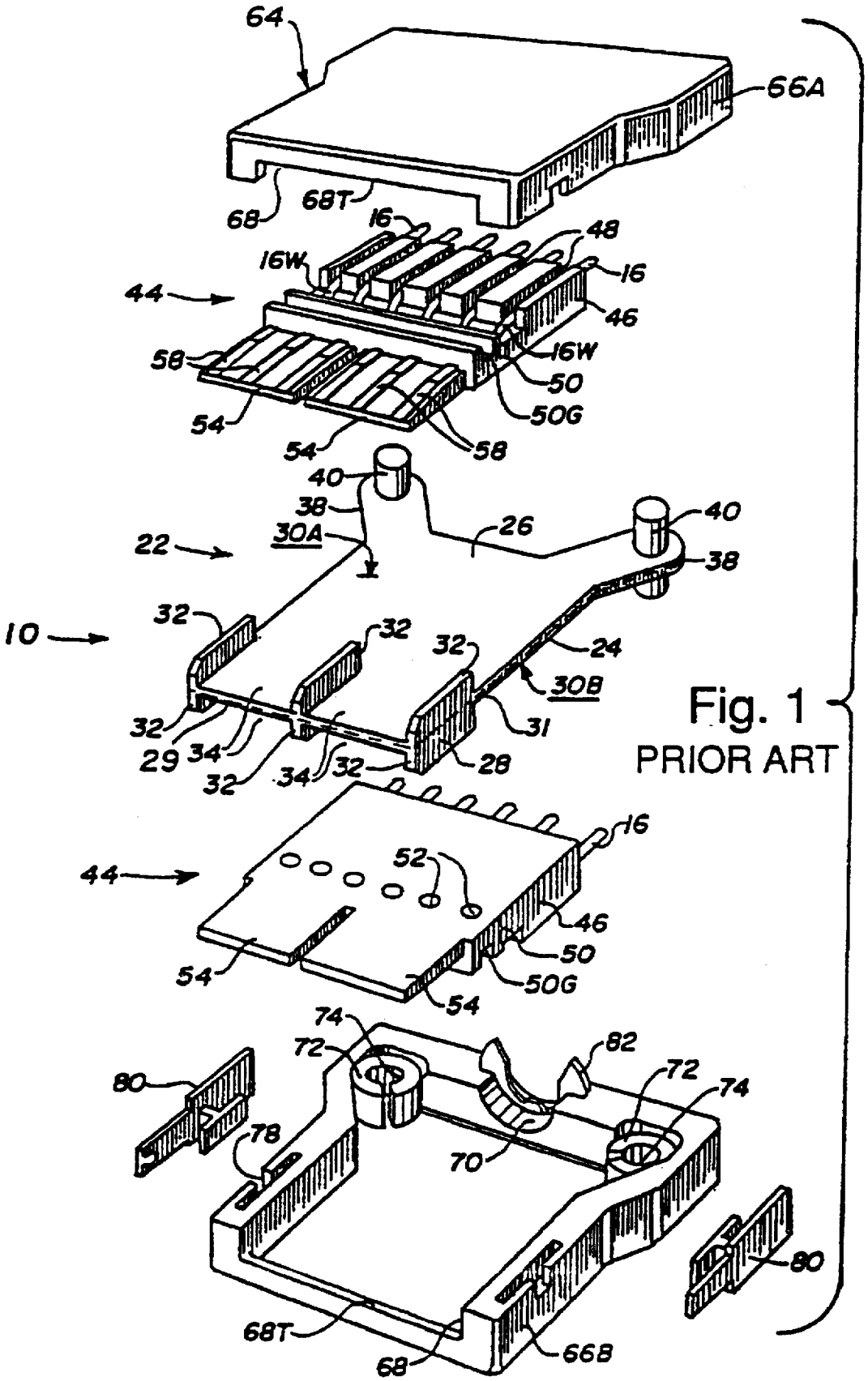
Fig. 1 PRIOR ART
FIG. 1 is an exploded perspective view of a plug terminator of the type disclosed in U.S. Pat. No. 4,824,383, having a metallic ground structure with least one wall defining a plurality of channels, and an insulated contact support member having plural fingers thereon, plural electrical contacts being provided on each of the fingers.

Throughout the following detailed description similar reference numerals refer to similar elements in all figures of the drawings.

With reference to FIG. 1 shown is a terminator generally indicated by reference character 10 of the type in accordance with U.S. Pat. No. 4,824,383 (Lemke). This patent is hereby incorporated by reference herein. Since the terminator 10 may be implemented in a form compatible for terminating a multiple conductor cable (as illustrated in FIG. 1) or in a form adapted for use with a multiple tracing substrate (as described in the immediately above-referenced patent) only the essential structural features of the terminator are discussed herein, with the details of the interconnection between the terminator and the conductors it is terminating being ommitted for clarity of discussion. Such interconnection details are set forth in the above-incorporated patent.

The heart of the plug terminator 10 is a metallic ground structure 22. The ground structure 22 includes a baseplate 24 having a main planar surface 26 with an integral portion 28 projecting forwardly therefrom. The projecting portion 28 terminates in a generally planar forward edge surface 29. Although the ground structure 22 is shown as being provided with an upper and a lower working surface 30A and 30B respectively thereon, it should be understood that a ground structure 22 having only one working surface 30 may be used and remain within the contemplation of the present invention. More specifically, the terminator can be implemented with a ground structure that includes only the structure on the upper working surface 30A of the ground structure 22 (that is, the structure above the dividing plane 31 extending through the baseplate portion 24 of the ground structure 22). In such an instance the opposite surface of the ground structure 22 would preferably be planar. Moreover, the remaining elements of the terminator as hereafter described would be appropriately modified to accept a ground structure 22 of this form.

In FIG. 1 a plurality of walls 32 extends from the forward projecting portion of the respective upper and lower working surfaces 30A, 30B of the baseplate 24. The walls 32 are arranged in side-by-side relationship to define a plurality of channels 34 across the surfaces of the projecting portion 28 of the baseplate 24. At least two such channels are defined. In the preferred embodiment the axes of the adjacent channels 34 are parallel to each other, although it is understood that such a relationship is not mandated. It should also be understood that although each working surface 30A, 30B of the baseplate 24 is shown as having the same number of channels 34, such a situation is also not necessarily required. It should also be appreciated that the walls 32 of the lateral extremities of the ground structure 22 may be ommitted, if desired.

The planar portion 26 of the baseplate 24 behind the projecting portion 28 has flanges 38 which flare farther rearwardly and slightly outwardly from the baseplate 24. The flanges 38 carry posts 40. In some instances it may be desired that the posts 40 be electrically conductive and in electrical contact with the conductive material of the baseplate 14. It should be appreciated that a ground structure of more than two working surfaces may be defined by disposing additional baseplates 24 (whether each baseplate implemented with one or two working surfaces) in any convenient stacked relation.

The plug terminator 10 further comprises a contact support member 44 having a main body portion 46 with an array of trenches 48 formed therein. The contact support member 44 is formed of an insulating material. A partition 50 having an indentation 50G is provided near the forward end of the body portion 46 of the contact support member 44. An array of apertures 52 (visible on the lower member 44 in FIG. 1) is provided through body 46 of the support member 44 in the region behind the partition 50, with one of the apertures 52 being aligned with the mouth of each of the grooves 48 for a purpose to be described. An array of fingers 54 extends forwardly from the body 46. The fingers 54 correspond in number to the number of channels 34 provided on the ground structure 22. In the assembled condition the fingers 54 extend into the channels 34 so that the forward ends of the fingers 54 are coterminal with the forward edge of the ground structure 22.

A groups of electrical contact elements 58 of any suitable configuration is embedded in the insulating material of each of the fingers 54. The contact elements 58 are arranged such that the planar blade of each contact element 58 is exposed on the surface of the finger 54 in which it is disposed. The contact element 58 extends rearwardly from the fingers 54 through the material of the partition 50. The contact element 58 ends in an overlying relationship with the apertures 52 in the body 46 just forwardly of the mouths of the trenches 48 therein. As seen in the Figures the top surfaces of the walls 32 of the ground structure 22 extend above the contact elements 58 when the same are received in the channels 34.

Although not here shown, each finger may be narrowed in transverse dimension and carry only a single contact element. Further, the insulating support structure of the plug terminator may alternatively be provided in a form in which each finger has a hollow recess in which individual or plural contacts may be housed.

The terminator 10 includes a protective casing generally indicated by reference character 64. The casing 64 is defined by complementary shell members 66A, 66B. Each shell member 66A, 66B has a forward cutout 68 having a tongue 68T therein. The configuration of the cutout 68 corresponds to the configuration of the body portion 46 of the contact support member in the vicinity of the partition 50. The rear wall of each of the shell members 66A, 66B has cooperating grooved openings 70 therein. The openings 70 are shaped to generally conform to the exterior configuration of and are sized to closely accept the transmission cable 12 in either round or flat form.

Figure 3:
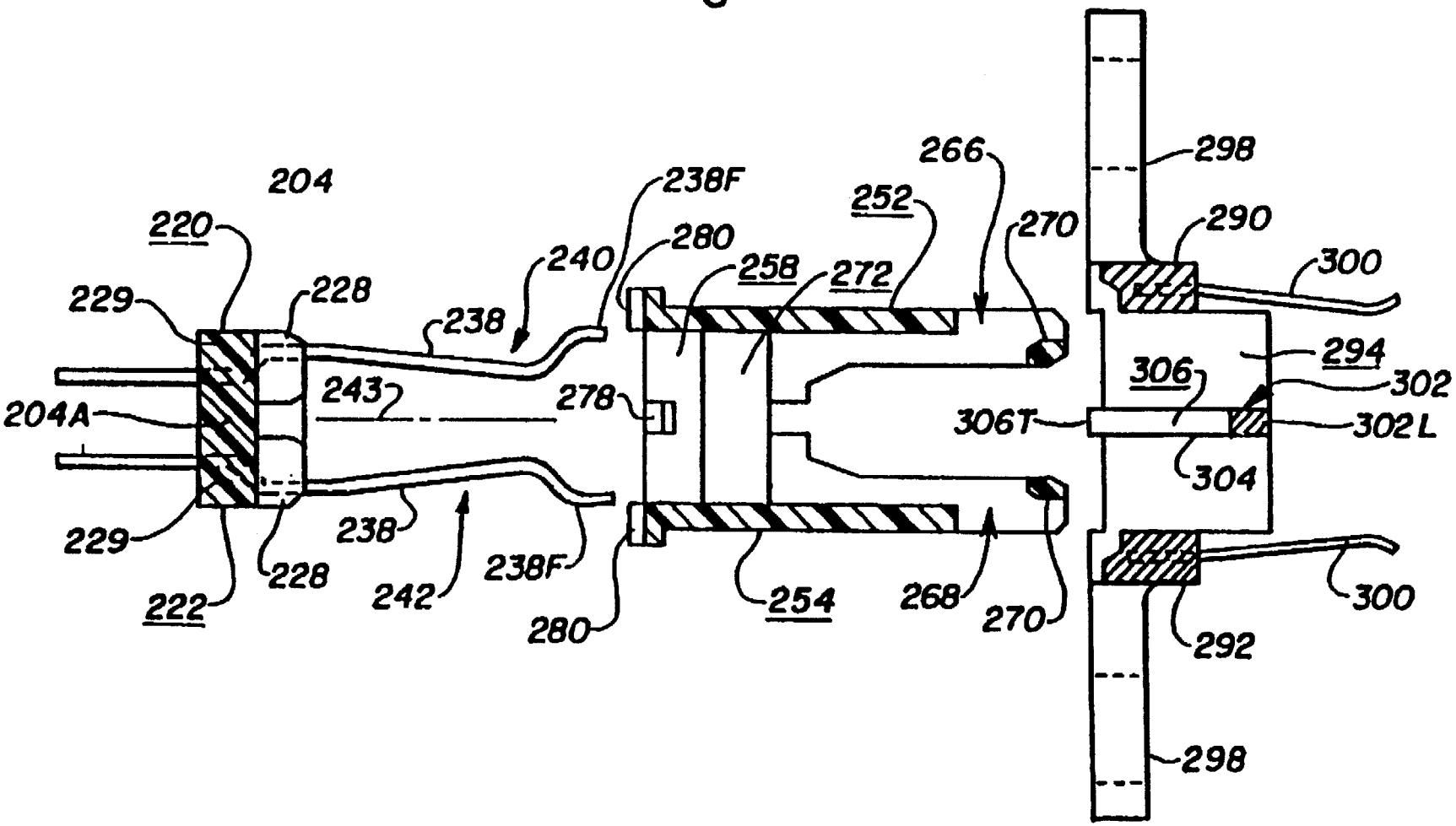
FIG. 3 is an exploded, side elevational section view of the receptacle shown in FIG. 2.

Adjacent to the rear wall of the shells 66A, 66B is a pair of abutments 72 with recesses 74. The recesses 74 are configured to accept snugly the posts 40 on the ground structure 22 in a press fit relationship. In the preferred case the shells 66A, 66B are each fabricated of a conductive material. It should be understood that the shells may be fabricated from a plastic material in which case a conductive surface 76 is formed by a suitable conductor layer disposed on the inner surface of each of the shells 66A, 66B (as shown in FIG. 3 for economy of illustration). The sidewalls of the shells 66A, 66B each carry notches 78 sized to accept locking tabs 80 which serve to hold the casing 64 together.

In the assembled condition the complementary shells 66A and 66B close on each other and are locked together by the tabs 80 and the press fit engagement of the posts 40 in the recesses 74 in the abutments 72. When so assembled the tongue 68T near the cutout 68 adjacent the front of the casing 64 engages in the groove 50G. To terminate a multiple conductor cable, as illustrated, the multiple conductors of the cable 12 extend through the registered openings 70 in the rear of the shells 66A, 66B and into the volume defined in the rear of the casing 64. The external jacket 14 of the cable 12 is stripped a predetermined distance from its end to expose the individual jacketed conductors 16 therein. An insulation displacement contact 82 severs the exterior jacket 14 of the cable 12 and electrically interconnects with the ferrule 20 of the cable 12. The insulation displacement contact 82 is captured in the grooved openings 70 adjacent the rear aperture of the shell to thereby electrically interconnect the conductive surface 76 on the interior of the casing 64 to a predetermined electrical potential.

Prior to the closing of the casing by the interengagement of the shells 66A, 66B, the individual conductors 16 of the cable 12 are themselves stripped of their jackets 16J and the conductive wires 16W thereof laid in one of the trenches 48 extending in the body portion 46 of the contact support structure 44. The end of each of the wires 16W overlays the end of one of the contact elements 58. The wires 16W and the contacts 58 are be suitably attached by any convenient expedient.

Figure 2:
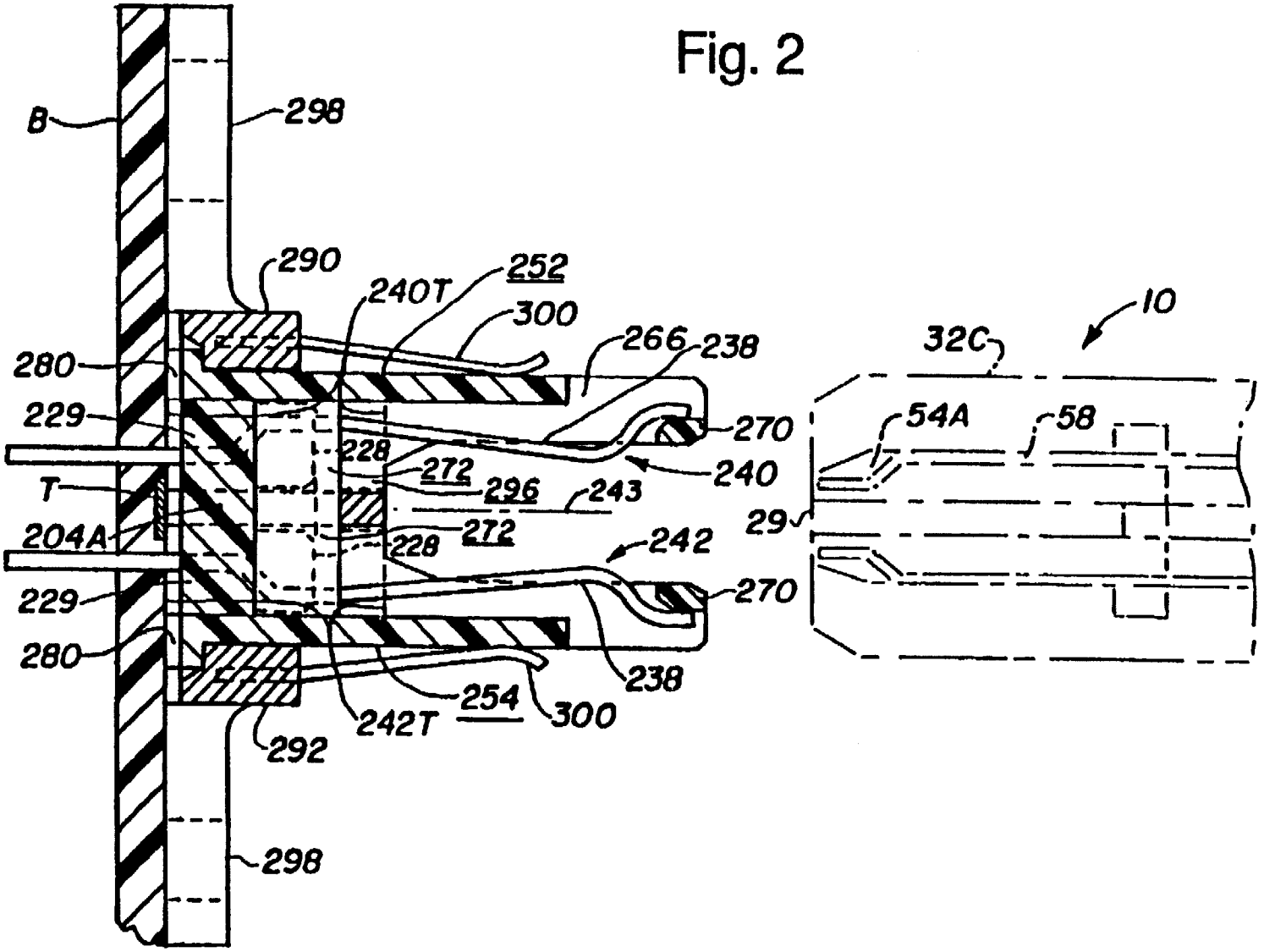
FIG. 2 is a side elevational view, entirely in section, illustrating a fully assembled receptacle in accordance with a first aspect of the present invention for receiving a plug terminator of the type shown in FIG. 1.
Figure 4:
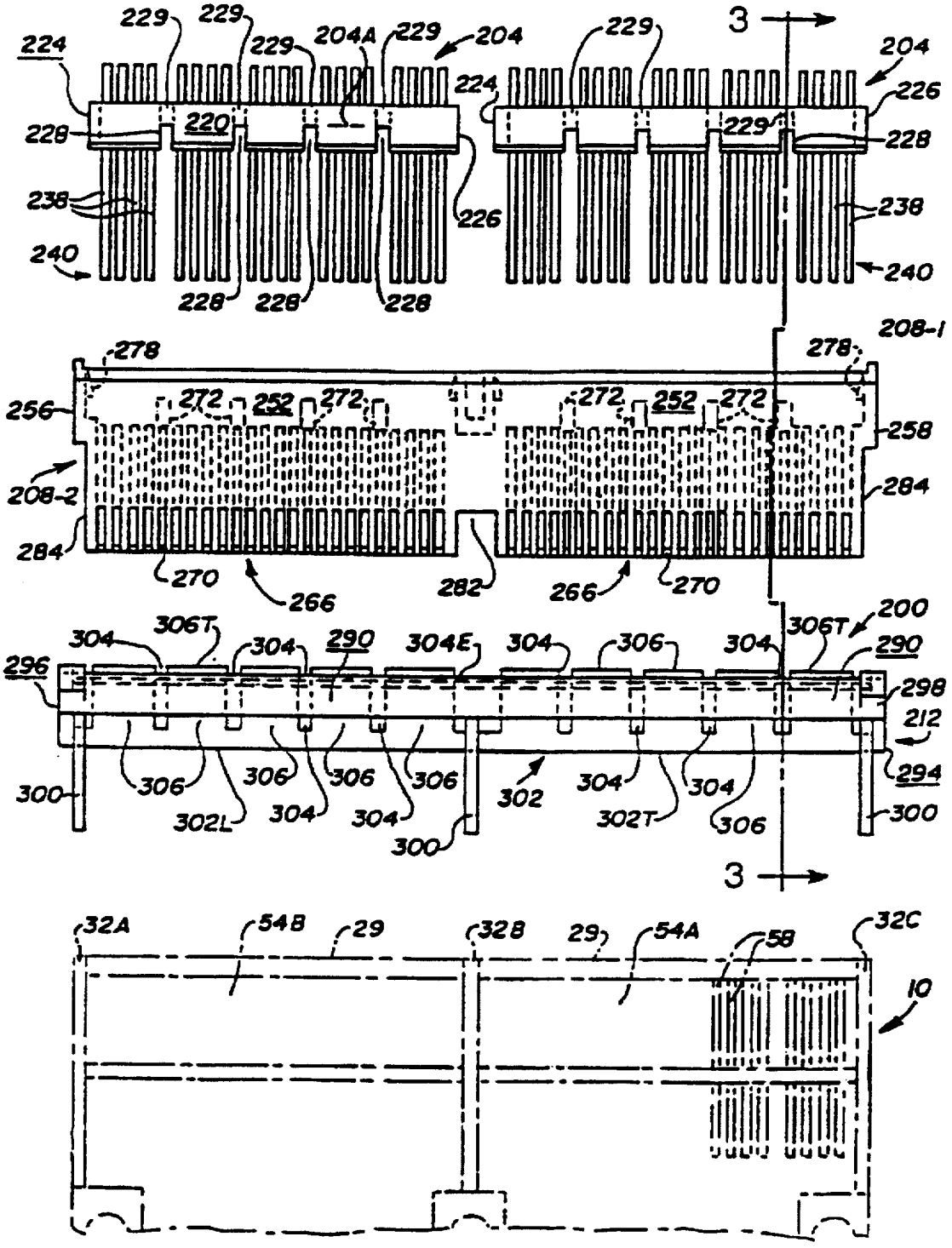
FIG. 4 is an exploded plan view of the receptacle shown in FIG. 2.

FIG. 2 shows a side elevational view, entirely in section, of a receptacle 200 in accordance with the present invention in the fully assembled state and ready to accept a plug terminator 10 shown in phantom lines. FIGS. 3 and 4 are respectively exploded side elevation and plan views of the receptacle 200 shown assembled in FIG. 2. Although the receptacle is adapted to accept a terminator in which each finger 54A 54B is provided with a plurality of contact elements 58 and the ground structure 22 thereof the terminator is provided with three walls 32A, 32B, and 32C whereby two channels 34A, 34B are defined it should be understood that the receptacle may be modified to accept a terminator of the type in which a single contact element 58 is disposed on each finger. The leading edge surface of the ground structure 22 is again indicated in the FIGS. 2 and 4 by reference character 29.

In FIG. 2 the receptacle is shown as mounted to the surface of a board B in a vertical through mount configuration. However, it should be appreciated that the receptacle of FIG. 2 may be implemented in any other mounting configuration, such as a right angle through mount configuration, a surface mount configuration, or a straddle mount configuration.

The receptacle 200 in accordance with the present invention includes three main structural components, namely, a contact block 204, a housing 208 and a frame 212.

Figure 5:
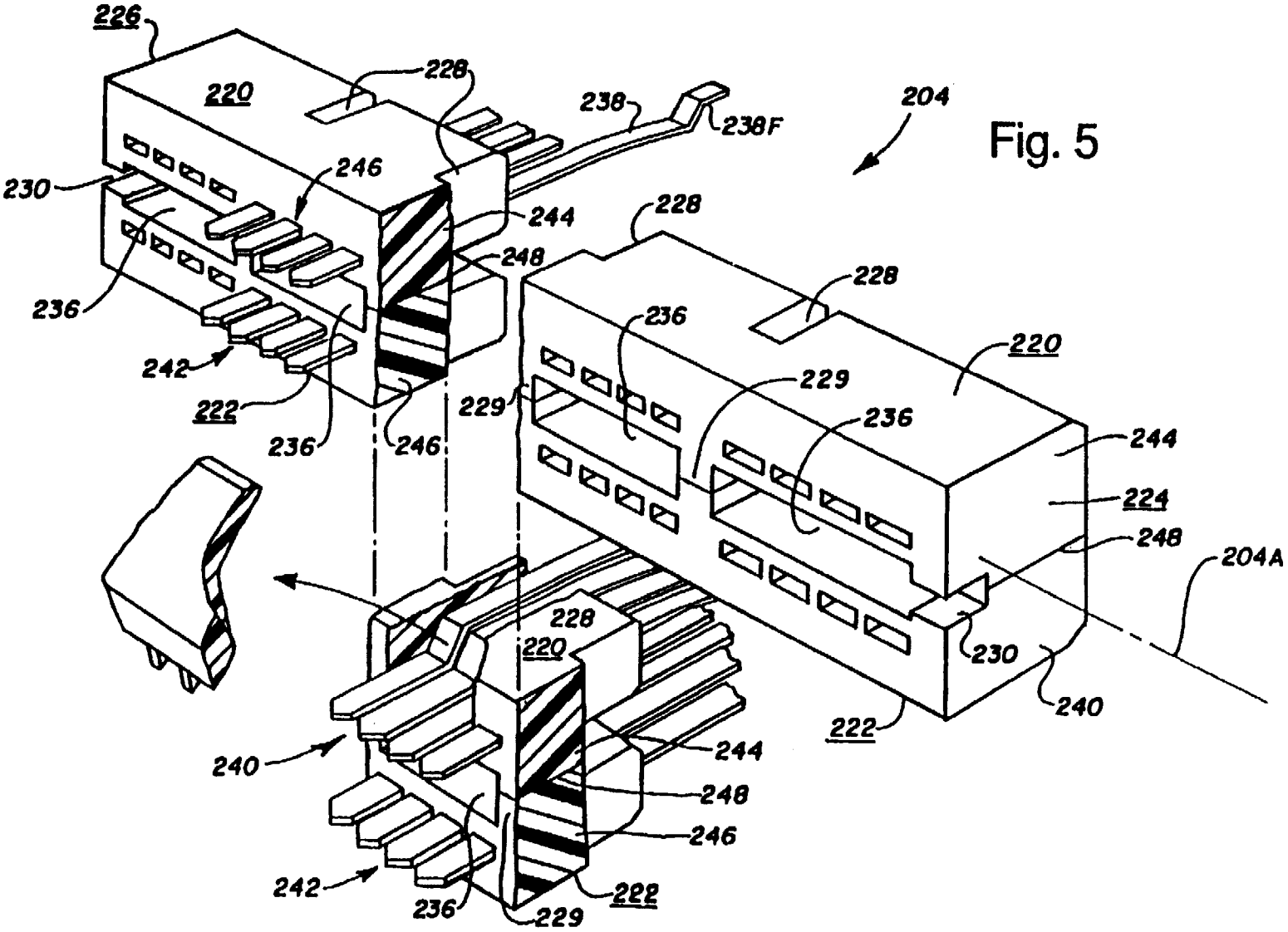
FIG. 5, 6, and 7 are, respectively, enlarged perspective views of a contact block, housing and frame used in a receptacle shown in FIG. 2.

With reference to FIG. 5 an isolated perspective of a single contact block 204 is shown, while in FIG. 4 a pair of the contact blocks 204 are shown. In the preferred case each contact block is an elongated member that is provided with upper and lower sidewalls 220, 222 and end walls 224, 226. The sidewalls 220, 222 have slots 228 formed therein, with the axis of the slots 228 extending perpendicularly to the axis 204A of the block 204. The remaining material of the block 204 directly adjacent to the slots 228 defines pillars 229.

At each end of the block 204 there is provided a cutout which defines a latch space 230 in each of the end walls 224, 226, respectively. The block 204 is interrupted by spaces 236 (best seen in FIG. 5) which have a major axis that extends generally parallel to the axis of the block 204 and which are provided for a purpose to be made clear herein. A plurality of electrical contact springs 238 are embedded into the block 204 and cooperate to define a first and a second array 240, 242 of contact springs, respectively (FIG. 5). In FIG. 5 a portion of the contact block 204 is broken to indicate the passage of the contact elements through the body of the block. The forward end of the contact spring 238 is curved, as at 238F.

As seen in FIG. 3 each array 240, 242 of contact springs is disposed in generally parallel relationship with respect to the axis of the block with one of the arrays (e.g., the array 240) lying above a bisecting plane 243 containing the axis 204A and the other of the arrays (e.g., the array 242) lying below the bisecting plane 243 of the connector. If the receptacle of FIGS. 2 to 7 or the receptacle shown in FIG. 8 is to be used in connection with a terminator as shown in which the fingers have hollow recesses therein in which the contacts thereof are disposed, the springs 238 in the receptacle may be replaced by corresponding pins.

In the preferred instance the block 204 is formed by the jointure of a first and a second bar element 244 and 246, respectively. Each of the bars 244, 246 is a molded member fabricated from a plastic material. The bars 244, 246 are held to each other along a jointure line 248 when the bars 244, 246 are received within the homing 204, as will be discussed. The latch spaces 230 and the spacers 236 may be defined by registered cut outs formed in each of the bars 244, 246 if this mode of fabrication of the contact block is used. It should be appreciated, however, that the block 204 may be integrally fabricated and it is shown in FIGS. 2 and 3 as being formed as an integral member for convenience of illustration.

Figure 6:
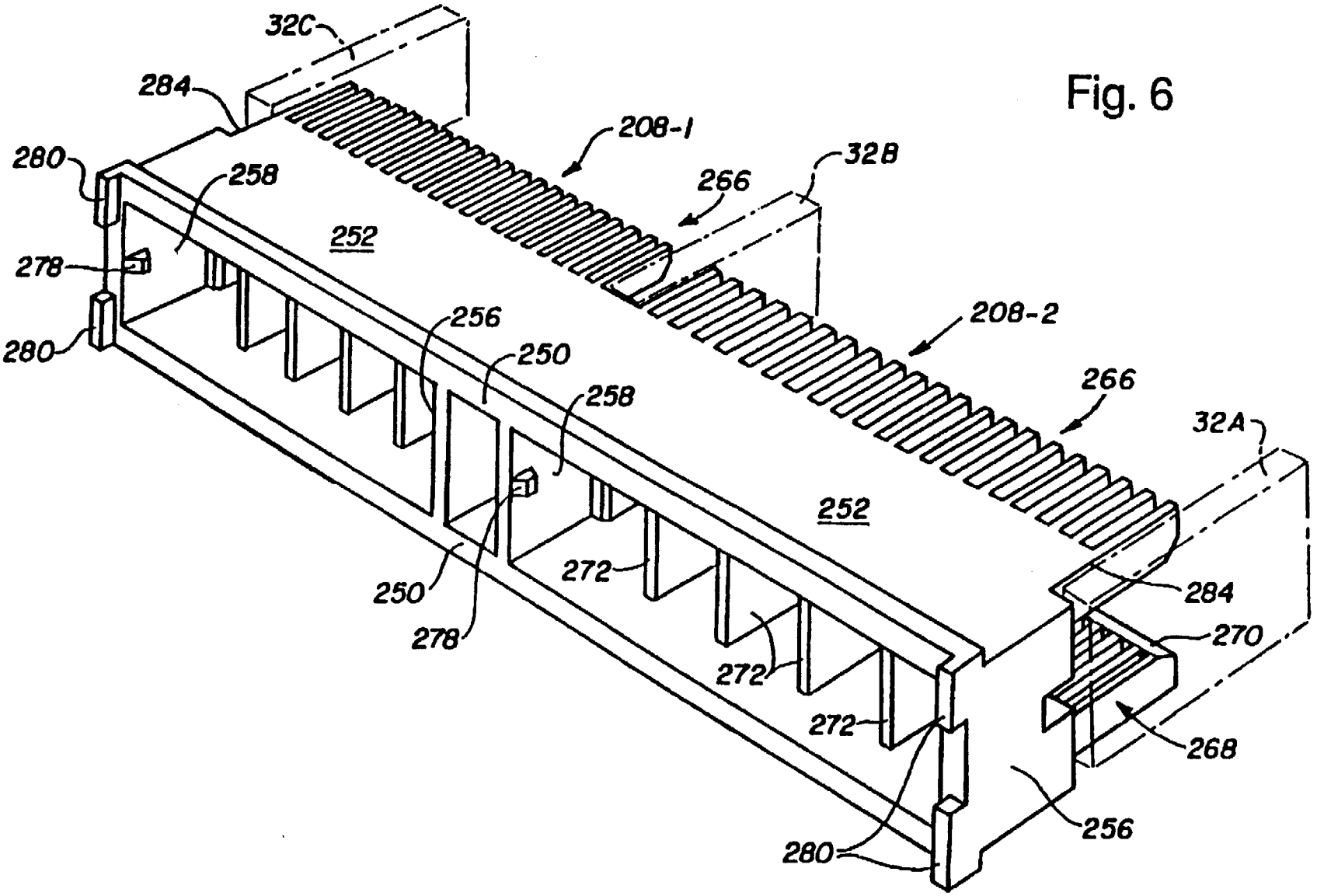

As noted earlier, the contact block 204 is received within a housing 208. FIG. 6 illustrates a perspective view of a typical arrangement for a housing. The housing 208 shown in FIG. 6 is formed from two conjoined housing sections 208-1, 208-2 connected in end to end relationship by webs 250. The structure shown in FIG. 6 may be conveniently formed by molding as an integral place. A housing section (e.g., the section 208-1) may be used singly or may form to any convenient length by molding or by connecting individual housing sections using any convenient mode of connection.

Each housing section 208 is a molded plastic member having an upper end and a lower sidewall 252, 254 joined by end walls 256, 258. The forward portion of each of the sidewalls 252, 254 is provided with an array of fingers 266, 268. The fingers in each array 266, 268 are themselves joined at their forward ends by a retaining lip 270 (best seen in FIGS. 2 and 3). The sidewalls 252, 254 are joined together by ribs 272 which are spaced axially along the sidewalls. The ribs 272 serve to join the sidewall 252 to the sidewall 254 and thereby to stabilize the structure of the housing 208.

The inside surface of each of the end walls 260, 262 is provided with latches 278. In the assembled condition the block 204 is introduced into the housing 208 such that the slots 228 in the contact block 204 (FIG. 5) each accept one of the ribs 272 of the housing 208. When so arranged, each of the pillars 229 (FIG. 5) of the contact block 204 is paired with and abuts a corresponding one of the ribs 272 of the housing. The contact springs 240, 242 in the upper and lower spring arrays, respectively, project into the spaces between adjacent fingers in the upper array 266 and in the lower array 268. The curved forward ends 238F of the contact springs are retained by the lip 270, as is best seen in FIGS. 2 and 3. The block 204 is held in position in the housing 208 by the interengagement of the latch 278 on the end walls 256, 258 with the spaces 230, 232 in the end walls 224, 226. Standoffs 280 are provided at any convenient location on the housing 208.

A gap 282 (FIG. 4) is provided between the fingers in the upper array 266 and in the lower finger array 268. As will be appreciated from FIG. 4, the gap 282 is located on the housing 208 in a position that coincides with the position at which the wall 32B on the terminator 10 will lie when the terminator is introduced into the receptacle. In addition, at each end of the housing 208 there is provided a step 284, which is sized and located to accept the walls 32A, 32C on the terminator. It should be understood that the fingers in the arrays 266, 268 may be appropriately interrupted by gaps analogous to the gap 282 to correspond to the locations of the walls 32 on the ground structure of the terminator being used with the receptacle.

Figure 7:
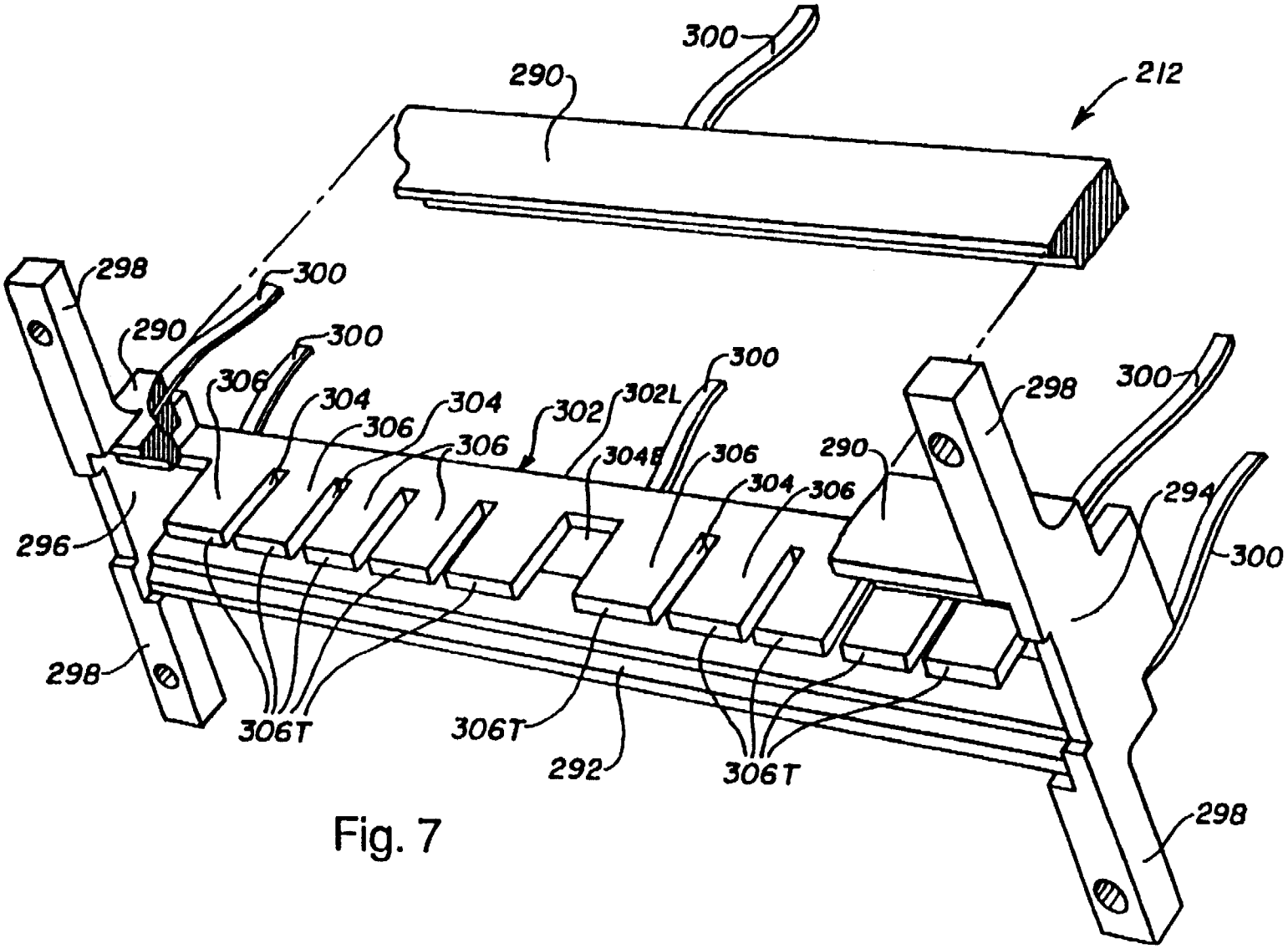
Figure 8:
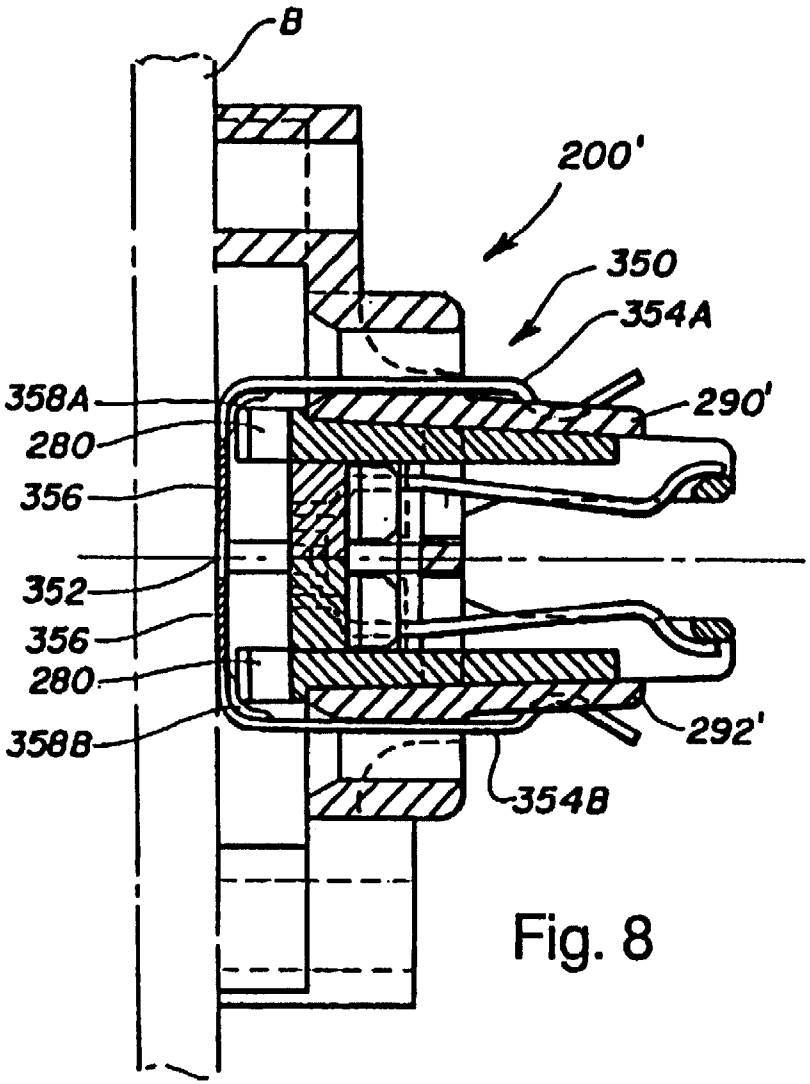
FIG. 8 is a view generally similar to FIG. 2 illustrating an alternate form of a receptacle for receiving a plug terminator of the type shown in FIG. 1.

The remaining component of the receptacle 200 is the frame 212, illustrated in FIG. 7. The frame 212 is a generally rectangular member formed from metal or metallized plastic. The frame 212 has upper and lower crossbars 290, 292 which are interconnected at corresponding ends thereof by uprights 294, 296 and at the midpoint thereof by an upright 297. Mounting wings 298 extend from the uprights 294, 296 to facilitate the mounting of the frame to the board B or the like. Forwardly projecting ground spring contacts 300 extend from the crossbars 290, 292 at predetermined spaced locations thereon, generally in the vicinity of the uprights 294, 296 and 297. In the embodiment shown in FIGS. 2 to 7, the spring contacts 300 are press fit into blind openings 301 in the crossbars 290, 292. The location of the ground contacts 300 corresponds to the locations of the gap 282 and the steps 284 on the housing 208. If desired the openings 301 could take the form of through bores dimensioned to closely accept the contacts 300.

Figure 9:
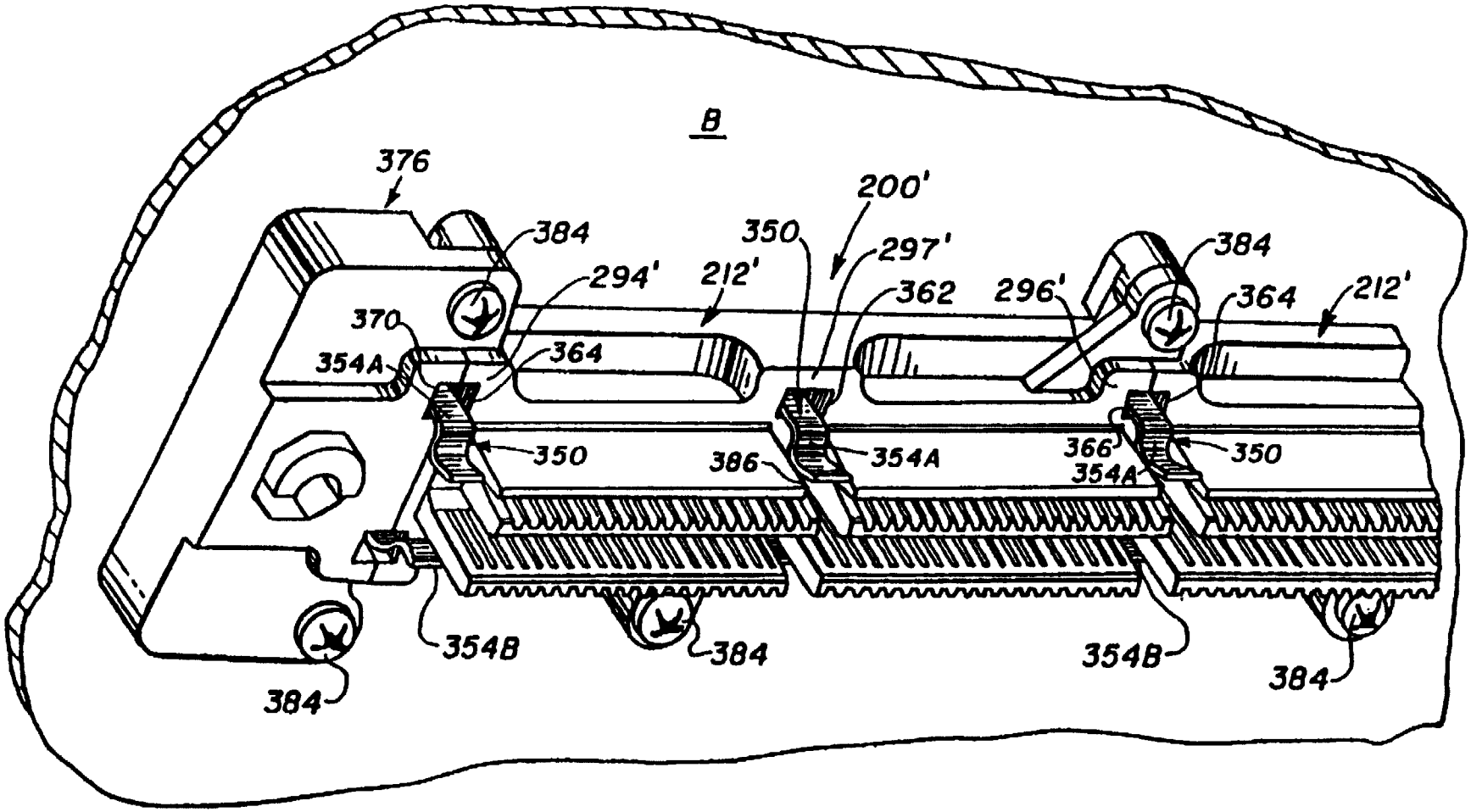
FIG. 9 is a perspective view of a receptacle shown in FIG. 8 mounted to a board.

In the embodiment of the receptacle 200' shown in FIGS. 8 and 9, the frame 212' is modified to eliminate the necessity of press fitting the springs 300 into the blind openings 301. In the modified frame 212' the ground contacts 300' take the form of generally U-shaped spring members 350 having a base 352 portion and forwardly extending legs 354A, 354B. If desired, two or more U-shaped springs 330 may be spaced axially and connected by axially extending webs 356 (shown in section in FIG. 20). The corners between the legs 354A, 354B and the base 352 are provided with stiffeners 358A, 358B.

The frame 212' is also modified to accept the modified springs 300'. To this end the frame 212' is provided with either a through bore 362 formed in the upright 297' substantially midway between the uprights 294', 296' (as seen in FIG. 9) or with slots 364, 366 respectively formed in the uprights 294', 296'. As may be seen in FIG. 9, in the case of the slot 364 in the upright 294', a corresponding slot 370 is provided in an endpiece 376 to form a bore to receive the spring member 350. In the case of the slot 366 in the upright 296', the registration with the slot 364 in the upright 294' on the frame 212' of an adjacent receptacle 200' closes the slot 366 thereby to define a bore.

When mounted to a board B each the spring member 350 is clamped thereagainst by standoffs 280 (FIG. 8) which form part of the contact block 204. The standoffs 280 act against the stiffeners 358A, 358B, to clamp the springs 350 against the board B when the receptacle 200' is secured to the board B, as by screws 384.

Figure 12:
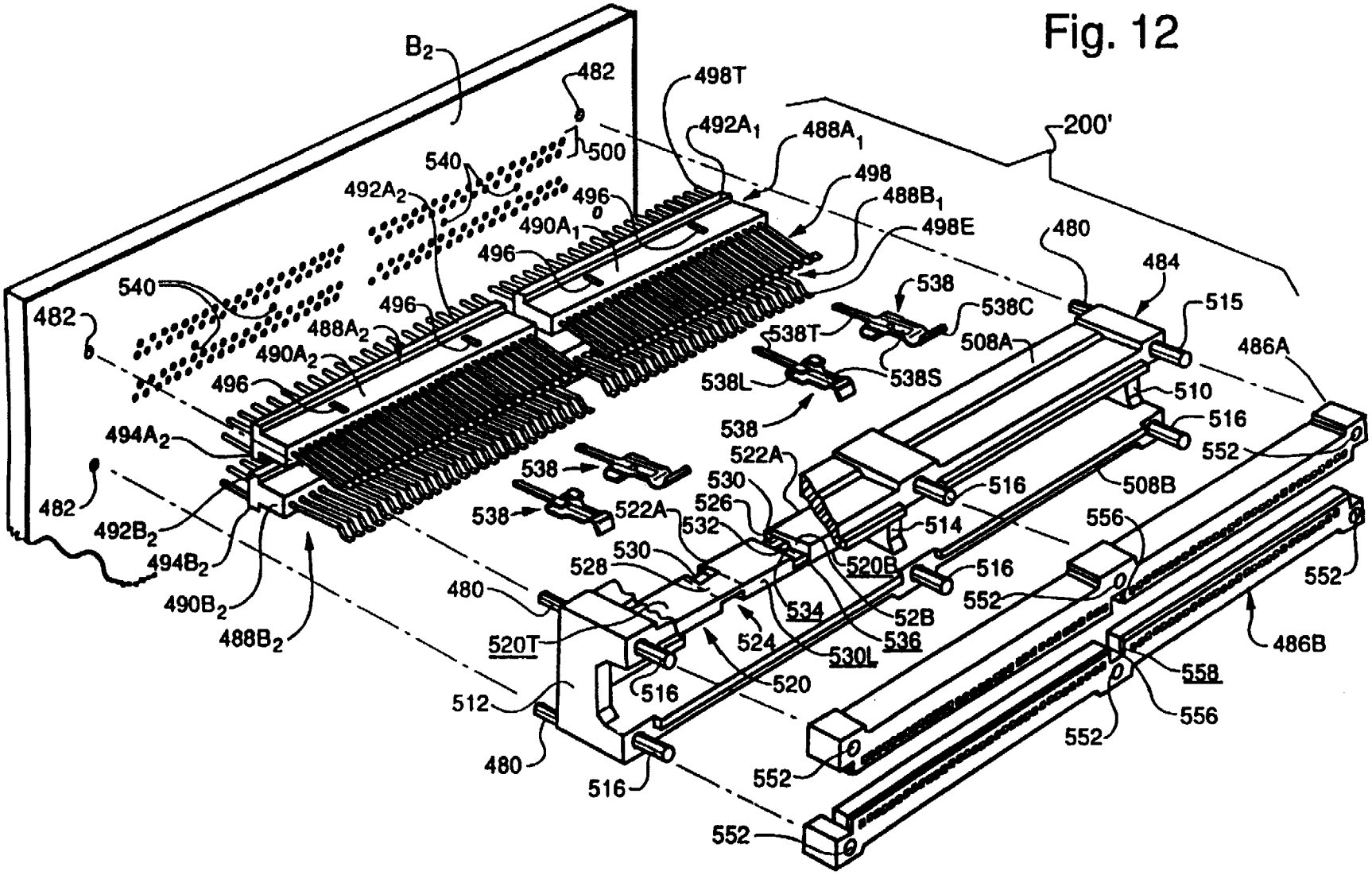
FIG. 12 is an exploded perspective view of an alternate embodiment of a receptacle for the plug terminator of the type shown in FIG. 11.

The crossbars 290', 292' are modified from that shown in FIG. 2 in that in FIG. 8 they extend further forwardly to overlie a greater portion of the contact block 204. The crossbars 290', 292' have gaps, as at 386 (FIG. 9), which accept the legs 354A, 354B of the spring 350 that extends through the central upright 297'. The lateral ends of the crossbars 290', 292' do not extend to the lateral ends of the uprights 294', 296', as the case may be, whereby the legs 354A, 354B of the springs passing through these uprights may be accommodated, as seen in FIG. 12, at 388, 390, respectively. It should be noted that the full extent of the trailing portion 240T, 242T of the contacts 240, 242 respectively, are not shown in FIG. 20, but may be arranged in any fashion to permit any form of surface or through mounting of the receptacle 200' to the board B. As will be developed, the trailing portions 240T, 242T are those portions of the contacts 240, 242, respectively, that are isolated by the plate 302.

Since the remaining discussion is to understood as applying to both the embodiment of the receptacle 200 having the frame 212 or to the embodiment of the receptacle 200' having the frame 212', the recitation of corresponding structural elements in the latter is omitted. A central plate 302 having a planar top and a planar bottom surface 302T and 302B, respectively, and a leading edge surface 302L thereon, extends between the uprights 294, 296 and 297 and across the frame 212 or 212'. The plate 302 is disposed generally parallel to the crossbars 290, 292. The central plate 302 is provided with an array of slots 304 which define a plurality of tongues 306. The lateral dimension of the slots 304 is sized such that as the frame 212 or 212' is inserted into the housing 208 the slots 304 accept the ribs 272 formed in the housing 208 (FIG. 6) and the pillars 229 in the contact block 204 (FIG. 5). The slots 304 may be enlarged, if necessary, as shown at 304E, to accommodate the spacing between the webs 250 in the housing 208, if the same are provided.

When the frame 212 or 212', as the case may be, is inserted over the housing 208 the crossbars 290, 292 lie exteriorly to the surfaces 252, 254, respectively, of the housing 208. In addition, the tongues 306 on the frame 212 project through the housing 208 and into the spaces 236 formed in the block 204. As seen in FIG. 2 the tips 306T of the tongues 306 extend through the block 204. When the receptacle is arranged with respect to the board B as shown in FIG. 2 the board may be provided with a ground tracing T such that the tips 3067 may abut the tracing T or lie within a predetermined close distance thereof. Also in the assembled condition, the tongues 306 of the frame surround each rib 272 and the abutted pillar 229 paired therewith.

As may be appreciated from the foregoing and as is best illustrated in FIG. 2, when the components of the receptacle are assembled the central metallic plate 302 of the frame 212 extends through the receptacle to isolate electrically the trailing portions 240T, 242T (FIG. 2) of the contact springs in the spring arrays 240, 242. The full extent of the trailing portions of the contact springs 240T, 242T is best illustrated in FIG. 2. That is to say, when the central plate 302 is positioned in the receptacle and is connected to a suitable predetermined electrical potential the plate 302 forms a structure that serves to isolate the trailing portions 240T, 242T of the spring contacts in the contact arrays 240, 242 they extend through the block 204 to the board B.

Moreover, when the terminator is introduced into the assembled receptacle the leading edge surface 29 of the ground structure 22 is brought into a predetermined close adjacency or into abutted relationship with the leading edge 302L of the central plate 302. At the same time the ground contacts 300 on the frame 212 (or the legs 354A, 354B of the spring member 350 in the case of the frame 212') electrically engage the walls 32 on the ground structure.

When the edge 29 on the ground structure 22 is, brought within a predetermined close distance of (on the order of 0.005 inch typically) or abutment with the edge 302L of the central plate 302 it should be apparent that the ground structure 22 is, in effect, extended by the action of the central plate 302 through the receptacle. The cooperating interaction of the ground structure 22 in the terminator and the central plate 302 in the receptacle serves to electrically isolate and control the impedance of the grouped contacts on the terminator and on the receptacle.

This structure inherently forms a low impedance transmission line between the forward edge surface 29 of the ground structure 22 and the leading edge surface 302L of the central plate 302 which functions as a "choke joint" to provide continuity of propagating ground current between the structure 22 and the plate 302. The choke joint includes the confronting frontal surfaces 294F, 296F and 297F (FIG. 7) on the respective uprights 294, 296 and 297 (and the corresponding surfaces on uprights 294', 296', 297') and the frontal surfaces 32F (FIG. 2) on the walls 32 of the ground structure 22. The engagement of the ground contact 300 or 300' of the frame 212 or 212', respectively, with the top surface 32T of the walls 32 of the ground structure 22 terminates the low impedance transmission line choke joint. The inductance of the termination may be altered from that shown in FIG. 7 by physically locating the contacts 300 (or 350) as close as possible to the frontal surfaces of the uprights which form part of the choke joint and by configuring the contacts 300 (or 350) such that they contact the top surfaces 32T of the walls 32 as close as possible to the choke joint.

Figure 10:
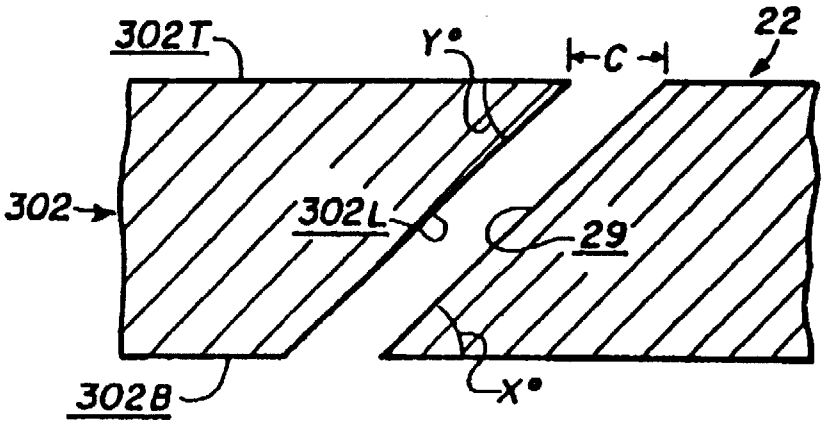
FIG. 10 is a side elevational view of an alternate arrangement of the central plate of the receptacle of the present invention.

As may be seen in FIG. 10 the impedance of the choke joint may be lowered by increasing the confronting surface areas of the forward surface 29 of ground structure 22 and the leading edge surface 302L of the plate 302. This may be accomplished by chamfering these surfaces at corresponding angles X and Y. Although any angle could be used, magnitudes of X and Y should preferably be on the order of forty-five degrees (45°) since too small an angle may be more difficult to manufacture.

By chamfering surfaces the impedance of the choke joint is made less dependent upon the clearance distance C.

Although the structure of the terminator and the receptacle as hereinabove described adequately serve to electrically isolate the signal carrying contacts, it is believed advantageous to provide an arrangement for these members that effects the interconnection between the ground structure of the terminator and the central plate of the receptacle in a more mechanically direct manner, and wherein the engagement of the terminator and the receptacle can be accomplished with less insertion force. Moreover, it is believed advantageous to provide a structure for the receptacle that eliminates tolerances due to the relatively loose fit between the housing of the receptacle and the contact block, as well as a source of tolerance variations due to the reaction of the plastic housing to the forces exerted thereon by the spring contacts. It is also believed advantageous to provide a receptacle arrangement wherein the interengaged signal contacts of the receptacle and the terminator are disposed more closely to the electrical ground.

Accordingly, in FIG. 1 through 15, an alternate embodiment of both the plug terminator and the corresponding receptacle therefor are shown.

Figure 11:
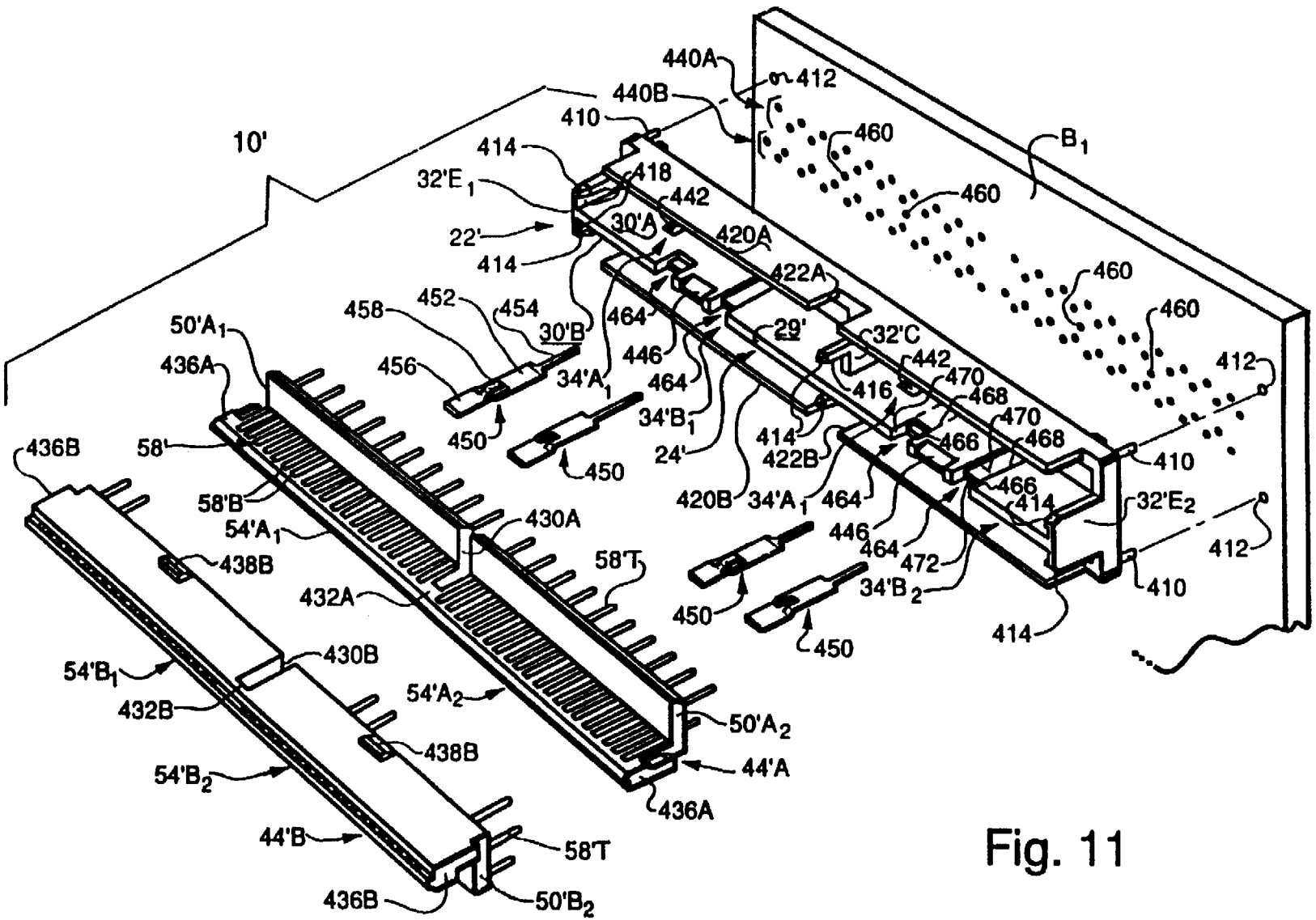
FIG. 11 is an exploded perspective view of the plug terminator, generally similar to that shown in FIG. 1, having forwardly extending grounding blades thereon.

Referring to FIG. 11 an exploded perspective view of an alternate embodiment of a plug terminator 10' is shown as mounted to the surface of a board $B_1$ in a vertical through mount configuration. Corresponding structural features of the terminator 10' of FIG. 11 and those of the terminator of FIG. 1 are indicated by primed reference characters. It should again be noted that, similar to the situation with the terminator of FIG. 1, the plug terminator 10' of FIG. 11 may also be implemented in any other board mounted configuration or a in cable terminating configuration and remain within the contemplation of the present invention.

In the embodiment of the plug terminator 10' shown in FIG. 11 the metallic ground structure 22' takes the form of an open-backed, generally frame-like member. The baseplate portion 24' of the ground structure 22' is configured to define both an upper and a lower working surface 30'A, 30'B, respectively, although it should be understood that the terminator 10' may be implemented with a ground structure that includes only a single working surface.

The baseplate 24' extends centrally across the ground structure 22'. A wall 32'C disposed centrally along each working surface (although only one such wall is completely visible in FIG. 13) and an end wall 32'$E_1$, located respectively at each lateral extremity of the baseplate 24' cooperate to define a pair of channels 34'$A_1$, 34'$A_2$ on the upper working surface 30'A and a pair of channels 34'$B_1$, 34'$B_2$, on the lower working surfaces 30'B. To facilitate the mounting of the terminator 10' to the board $B_1$ mounting posts 410 are disposed on the rear surface of the terminator 10'. The posts 410 are received in corresponding openings 412 provided in the board $B_1$.

The forward ends of the walls 32'C, 32'$E_1$ and 32'$E_2$ are tapered, as at 414, thereby to define lead-ins thereon. Each of the central walls 32'C is undercut, as at 416, such that a forward edge of each central wall 32'C is spaced behind the forward edge surface 29' of the ground structure 22'. The inside surface of each of the end walls 32'$E_1$, 32'$E_2$ adjacent each working surface of the ground structure 22' has a camming slot 418 provided therein.

An upper and a lower shroud 420A, 420B, respectively, is disposed in parallel relationship to the upper and lower working surfaces 30'A, 30'B of the baseplate 24' of the ground structure 22'. Each of the shrouds 420A, 420B has a respective cut out 422A, 422B that overlies the central wall 32'C of the working surface to which it is proximate.

A first and a second contact support member 44'A, 44'B, each molded or otherwise formed of an insulating material, is arranged for receipt in the channels 34'$A_1$, 34'$A_2$, or 34'$B_1$, 34'$B_2$, respectively defined on each of the working surfaces 30'A, 30'B of the ground structure 22'. Each contact support member 44'A, 44'B is generally L-shaped when viewed in side elevation. Each of the contact support members 44'A, 44'B is interrupted by the presence of a respective central slot 430A, 430B which defines on each of the contact support members 44'A, 44'B a first and a second contact finger 54'$A_1$, 54'$A_2$, and 54'$B_1$, 54'$B_2$, respectively. A partition 50'$A_1$, 50'$A_2$, and 50'$B_1$ (not visible), 50'$B_2$ extends from each respective finger 54'$A_1$, 54'$A_2$, and 54'$B_1$, 54'$B_2$.

Each of the fingers 34'$A_1$, 54'$A_2$, defined on the contact support member 44'A corresponds to a respective channel 34'$A_1$, 34'$A_2$, provided on the working surface 30'A of the ground structure 22 while each of the fingers 54'B$_1$, 54'B$_2$ defined on the contact support member 44'B corresponds to a respective channel 34B$_1$, 34'B$_2$ provided on the working surface 30'B of the ground structure 22'. As seen in FIG. 11, the central slot 430A, 430B does not extend completely through the contact support member 44' in which it is provided, thus define a web 432A, 432B on each member 44'. Each lateral end of each contact support member 44', 44'B has a tab 436A, 436B thereon, as the case may be, provided for a purpose to be described. In addition, the undersurface of the fingers 54'A$_1$, 54'A$_2$, 54'B$_1$, 54'B$_2$ of the contact support members 44', 44'B has a pair of locking latches 438A, 438B thereon. The latches 438A are not visible in FIG. 11, but may be seen in FIG. 13.

A plurality of electrical contact elements 58' of any suitable configuration is embedded in the insulating material of each fingers 54'A$_1$, 54'A$_2$, 54'B$_1$, 54'B$_2$, of each contact support member 44'A, 44'B. The contact elements 58' are arranged such that the planar portion 58'P of each contact element 58' is exposed on the surface of the fingers 54'A$_1$, 54'A$_2$, 54'B$_1$, 54'B$_2$, in which it is disposed. The tail portion 58'T of each electrical contact element 58' extends rearwardly through the partitions 50A, 50B of the support member 44'A, 44'B, as the case may be. Not all of the tails from the support member 44'B are illustrated. The tails 58'T of the contact elements 58' are offset in a predetermined pattern, and each tail 58'T extends through one of a correspondingly arranged pattern of openings 440A, 440B provided in the board B$_1$.

Owing to the relative registered relation of the slot 330A, 330B with respect to the central walls 32'C of the ground structure 22', as well as the precise dimensioning of the slots and the transverse dimension of the central walls, when the fingers 54'A$_1$, 54'A$_2$, 54'B$_1$, 54'B$_2$, on each contact support member 44'A, 44'B are inserted into a corresponding channel 34'A, 34'B in the ground structure 22' each central wall 32'C projects with close clearance into a slot of the contact support member, with the web 432A, 432B of each of the latter being closely received in the undercut 416 in the former. The close dimensioning of these members provides a guiding and a centering action which serves to precisely locate the fingers within the channels and thus, the contacts 58' within the terminator 10'.

Each of the camming slots 418 formed on the inside surface of each end wall 32'E$_1$, 32'E$_2$, of the ground structure 22' receives one of the tabs 436A, 436B provided at each lateral end of the contact support member 44'A, 44'B. The fingers 54' of each contact support member are thus supported on a working surface 30A, 30B of the baseplate, as the case may be. The partitions 50' of the support member close the open back of the ground structure 22'.

Each of the contact support members is secured in the ground structure 22' by the engagement of the locking latches 438A, 438B on the undersurfaces of the fingers thereof into notches 442 formed in the rear edge of the baseplate 24'. Entry of the contact support members into their respective channels is facilitated by lead-in ramps 446 formed on each working surface of the baseplate along the forward edges thereof.

In accordance with this embodiment of the invention, at least one but preferably a plurality of grounding contacts 450 is secured into electrically conductive engagement with the ground structure 22'. As is better seen in the side sectional view of FIG. 13, the grounding contacts 450 project forwardly past the forward edge surface 29' of the ground structure 22'. Each grounding contact 450 includes a generally planar shank portion 452 having a tail 454 extending rearwardly therefrom. The tail may have any convenient dimension or may be split into plural tails, if desired. The forward region of the shank portion is stamped, punched or otherwise worked to define a planar blade 456 having an associated tang 458. The blade 456 and the tang 458 are vertically offset from the shank. The tails 454 of the grounding contacts 450 are received in openings 460 provided in the board B$_1$ for the purpose.

Each grounding contact 450 is received by the working surface 30'A, 30'B of the baseplate 24' on which it is mounted by a recessed tongue arrangement generally indicated by the character 464. The recessed tongue 464 is defined by a notch 466 formed in the forward edge surface 29' of the baseplate 24'. A first groove 468 extends rearwardly from each notch 466 over the entire width of one working surface 30'A, 30'B of the ground structure 22'. A vertically registered cooperating second groove 470 extends partially across the opposite working surface 30'B, 30'A, as the case may be. In FIG. 11, each working surface 30'A, 30'B of the baseplate 24' of the ground structure 22' has a pair of recessed tongues 464 provided thereon, one recessed tongue 464 for each working surface being located on each side of the central wall 32'C. Of course, if an implementation of the terminator of this embodiment of the present invention uses a ground structure that is provided with only one working surface, the partial groove 470 corresponding to the full groove 468 is formed on the outside surface of the ground structure opposed to the working surface thereof. It is noted that the forward edge 472 of the tongue 464 of the baseplate remaining after the same is defined by the notches, full groove and partial groove formed is set back, or recessed, from the leading edge surface 29' of the baseplate 24'.

Figure 13:
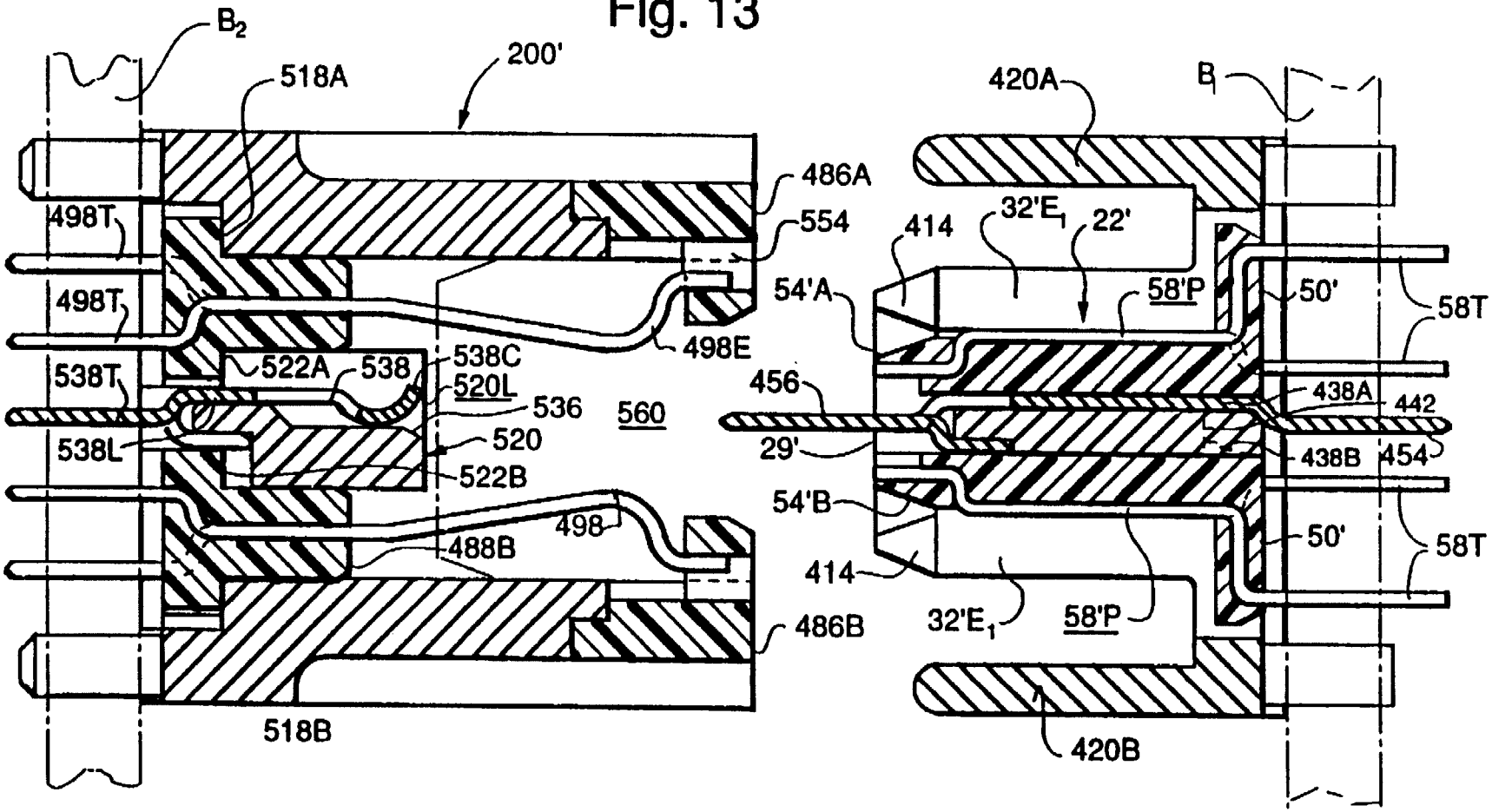
FIG. 13 is a side sectional view of both the receptacle and the plug terminator shown in FIGS. 11 and 12 taken along section lines as shown in FIG. 14.
Figure 14:
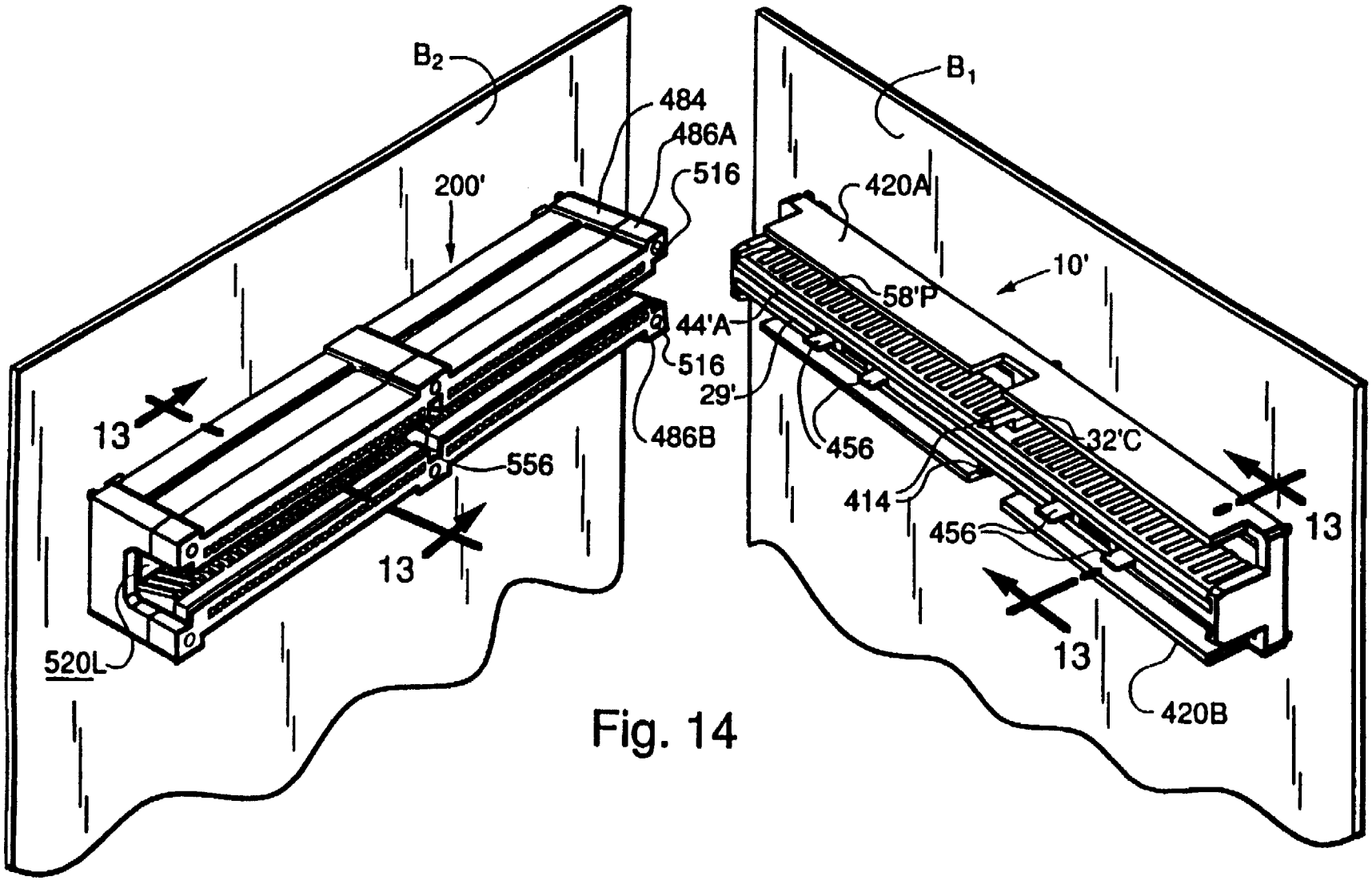
FIG. 14 is a perspective view of the plug terminator of FIG. 11 and the corresponding receptacle of FIG. 12 in confrontational relationship.

As is best seen in FIG. 13, to mount the grounding contact 450 to the baseplate 24', the shank 452 is received into the full groove 468 defining the tongue 464, while the tang 458 is accepted into the corresponding partial groove 470. The blade portion 456 of the grounding contact 450 thus extends forwardly past the forward edge surface 29' of the grounding structure 22', as seen in FIG. 13.

A receptacle 200' adapted to accept the terminator 10' of the type shown in FIG. 11 having the projecting ground contacts 450 thereon is shown in exploded view in FIG. 12 and in side section in FIG. 13. The receptacle 200' is also shown as mounted to the surface of a board B$_2$ in a vertical through mount configuration. To effect the mounting posts 480 disposed on the rear surface of a die cast metal frame 484 of the receptacle 200' are received in openings 482 provided in the board B$_2$ for this purpose.

In accordance with the present invention the receptacle 200' includes a die cast metallic frame 484 having an upper and lower insulating nosepiece 486A, 4896B, respectively, mounted thereon and a predetermined number of contact blocks 488 introduced thereinto. The number of contact blocks 488 corresponds to the number of fingers on the associated plug terminator. Thus, contact blocks 488A$_1$, 488A$_2$ (not totally visible), 488B$_1$, 488B$_2$ are used in the embodiment of the invention implemented in the Figures.

With reference to FIG. 12 each contact block 488 takes the form of an elongated body portion 490 that is provided with a first shoulder generally indicated by the character 492 and a second shoulder generally indicated by the character 494. Ribs 496 are formed on the body portion 490 of the contact blocks 488. A plurality of electrical contact springs 498 is embedded into each block 488. Each of the springs 498 on a given contact block 488A$_1$, 488A$_2$, 488B$_1$, 488B$_2$ corresponds to a contact element 58' on the corresponding finger 54'$A_1$, 54'$A_2$, 54'$B_1$, 54'$B_2$ of the plug terminator 10'. Each contact spring 498 is cantilevered from the contact block 488 in which it is embedded, with the extreme forward end 498E of each spring 498 being curved. Each of the springs 498 has a tail portion 498T that extends from the rear surface of the contact block 488 in which it is embedded. Preferably, the tails 498T of the springs are offset in a predetermined pattern. Each tail 498T is received in one of a corresponding pattern of openings 500, 502, formed in the board $B_2$. It should be noted that although each of the contact blocks 488 is shown as a separate member the plural blocks 488 may be interconnected using suitable webs, so long as appropriate clearance space is provided within the die cast frame 484 to accommodate the connecting webs, as should be clear to those with skill in the art.

The main structural component of the receptacle 200' is the frame 484. Preferably, the frame 484 is fabricated as a die cast metallic member, although it could, in principle, be molded from plastic. The frame 484 is a generally rectangular member having an open front and rear. The frame 484 includes upper and lower crossbars 508A, 508B, which are interconnected at corresponding ends by uprights 510, 512 and at the midpoint by an upright 514. A portion of the upper crossbar 508A is cut away in FIG. 24 for clarity of illustration. The mounting posts 480 mentioned earlier are provided on the rear surface of the uprights 510, 512. Forwardly extending mounting pegs 516 extend from the crossbars 508A, 508B at predetermined space locations thereon, generally in the vicinity of the uprights 510, 512 and 516. The rear edges of the crossbars 508A, 508B have shoulders 518A, 518B (best seen in FIG. 13) formed therein.

A central plate 520 having a planar top and a planar bottom surface 520T and 520B, respectively, and a leading edge surface 520L thereon, extends across the frame 484 between the uprights 512 and 514 and between the uprights 414 and 410. The central plate 420 is in generally parallel relationship to the crossbars 408A, 408B. The rear edges of the top and a bottom surfaces 520T and 520B have first and second shoulders 522A and 522B, respectively, thereon.

As is seen in the cutaway portion of FIG. 12, in a manner similar to that discussed with the terminator 10', the central plate 520 is also provided with recessed mounting tongues 524. The tongues 524 are defined by a notch 526, and paired, vertically registered, full and partial grooves 528, 530, respectively. The full groove 528 extends across the entire upper or lower surface 520T, 520B of the central plate 520, as the case may be, and interrupts both the front and rear edge surfaces thereof. Although not visible in the drawings, the full groove 528 has vertical lead-in surfaces disposed adjacent to the front and rear edge surfaces of the central plate 520. The partial groove 530, on the other hand, extends only partially across the other of the surfaces, and interrupts only the rear edge of the plate 520. A vertical lead-in surface (not shown) is disposed adjacent to the rear edge surfaces of the central plate 520. The full groove 528 is stepped, as at 532, to define a shelf 534. The forward edge of the full groove 528 has a beveled surface 536 thereon. Owing to the presence of the notches 526, the tongues 524 are recessed, or inset, from the rear edge surface of the plate 520.

Grounding contacts 538, generally similar to those of the terminator 10', are secured to the central plate 520 at each of the tongues 424 thereof. The contacts 538 are generally planar members with a central slot 538S formed thereon. A tail 538T projects rearwardly from the planar portion. The tails 538T are received in openings 540 provided in the board $B_2$ for that purpose. The front end of the contact 538 is curved, as at 538C, while the rear edge of the planar portion is bent back on itself, thereby to define a fork-like locking clip 538L.

As is better appreciated from the sectional view of FIG. 13, a grounding contact 538 is introduced onto the central plate 520 of the die east metal frame 484 from the rear thereof, with the major planar portion of the contact 538 being accepted in the full groove 528 while the arms of the forked clip 538L extend into the partial groove 530 that vertically registers with the full groove 528. The curved leading edge 538C of the ground contact 538 and the beveled surface 536 at the front end of the major groove 528 define a lead-in.

The final element of the receptacle is the nosepiece 486A, 486B. Although shown as two distinct pieces, it should be appreciated that they nosepiece may be defined by an integral member wherein the major sections thereof are linked together by suitable webs. Each of the nosepieces 486A, 486B has an opening 552 that receives one of the forwardly extending pegs 516 disposed at the forward edges of the crossbars 508A, 508B of the die cast metal frame 484. The nosepieces 486A, 486B are interference fit onto the pegs 516, or they may be otherwise there secured using any suitable expedient, such as adhesive or by deforming the peg.

Each nosepiece 486A, 486B is an elongated member molded of an insulating material. Each nosepiece 486 is provided with a plurality of windows 554, each of which receives and supports the curved forward end 498E of the springs 498 cantilevered from a contact block 488. A precisely dimensioned guide slot 556 having a lead-in surface 558 thereon is formed in each nosepiece 486A, 486B, respectively.

To assemble the receptacle, the nosepieces 486A, 486B are secured to the pegs 416 on the die cast metal frame 384 and the ground contacts 538 are slipped onto the tongues 524 in the central plate 520. The contact blocks 488 are then introduced through the open rear of the frame 484, until the shoulders 492, 494 on the blocks 488 engage with the shoulders 536 formed on the rear of the crossbars 508A, 508B and the shoulders 522A, 522B on the central plate 520. The ribs 496 on the contact blocks 488 insure that the same are received with a tight, interference fit within the frame. The springs 538 project forwardly from the blocks 488. The curved ends 538E of each spring 538 is guided into a corresponding window 554 of the nosepiece 486. This may be done by placing a member shaped similarly to the plug into the central cavity 560 (FIG. 13) of the receptacle, and as the blocks are inserted into the frame the forward ends of the springs are lifted and snap into place in the windows.

With the plug terminator 10' and the receptacle 200' each fully assembled and in confronting relationship (FIG. 14) the ground contacts on the terminator project toward the receptacle. As the components are brought together they are guided into aligned engagement with each other by the cooperative interaction between the tapered end of the central wall 32'C on each working surface 30'A, 30'B of the terminator 10' and the corresponding precisely dimensioned guide slot 556A, 556B formed in each respective nosepiece 486A, 486B. Recalling that the engagement of the slot 430 in the contact support members 44' with the central wall 32'C serves to accurately position the contacts 58' on the terminator 10' with respect to the wall 32'C, it follows that precise engagement between the walls 32'C and the nosepieces 486 serves to accurately align the contacts 58' with respect to the springs 538 in the receptacle. Moreover, the tight fitting engagement between the nosepieces 486 and the frame 484, as well as the tight fit between the contact blocks 488 and the frame 484, prevents the contacts 438 from becoming misaligned as the plug is received thereby. As a result, the terminator and plug arrangement described herein is adapted to provide accurate positioning of respective contact elements on center-to-center spacing as fine as 0.025 inches.

As the terminator and the receptacle are mated, the central portion of the contact springs 498 of the receptacle 200' wipe against the exposed upper surfaces 58'P of the contact elements 58' on the terminator 10' thereby to establish electrical contact therebetween. Ground contact between terminator 10' and the receptacle 200' is established as the planar blade portion 456 of the ground contacts 450 of the terminator 10' lift and slide beneath the ground contact 538 mounted to the central plate 520 of the receptacle 200'. The blade 456 is clamped between the ground contact 538 and the surface 534.

Figure 15:
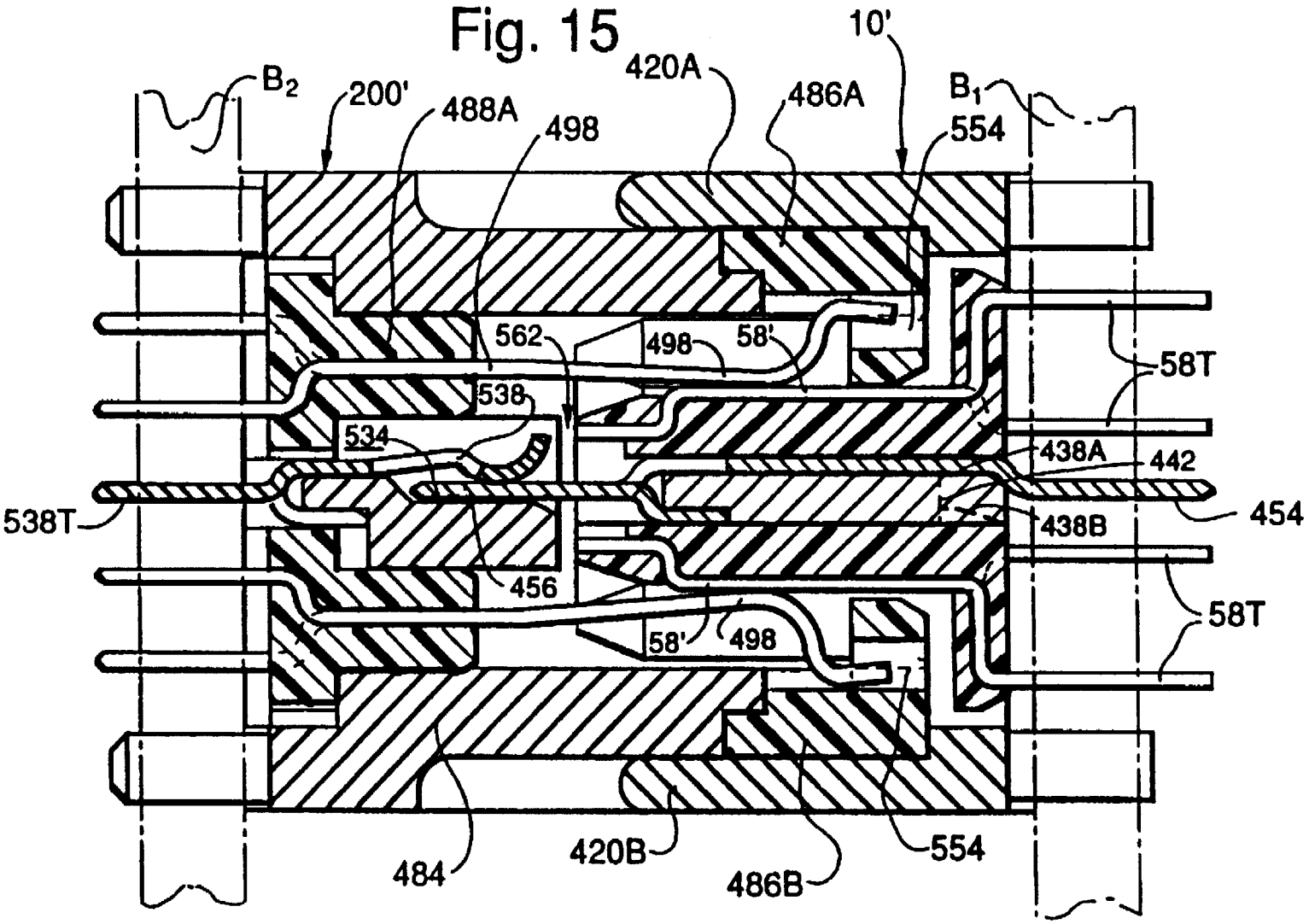
FIG. 15 is a side elevational view, in section, of the interconnected terminator of FIG. 11 as received within the receptacle of FIG. 12.

As may be appreciated from the foregoing and as is best illustrated in the side sectional view of the fully assembled and interconnected components shown in FIG. 15, since the central metallic plate 520 of the frame 484 and the edge surface 29' on the ground structure 22' are brought within a predetermined close distance of (on the order of 0.005 inch typically) or abutment with each other (the distance being exaggerated at 562) it should again be apparent that the ground structure 22' is, in effect, extended by the action of the central plate 520 through the receptacle 200'. The cooperating interaction of the ground structure 22' in the terminator 10' and the central plate 520 in the receptacle 200' again serves to electrically isolate and control the impedance of the grouped contacts on the terminator and on the receptacle. This structure may again be seen to form inherently a low impedance transmission line between the forward edge surface 29' of the ground structure 22' and the leading edge surface 520L of the central plate 520 which functions as a "choke joint" to provide continuity of propagating ground current between the structure 22' and the plate 520'. However, in this embodiment, a joint having lower inductance joint is established, and the signal contacts are disposed more proximally to the ground plane extending through the engaged terminator/receptacle. If desired the modifications to the choke joint structure shown in FIG. 10 may also be used to advantage.

Those skilled in the art may readily appreciate that in view of the foregoing a receptacle has been provided that provides efficient continuation of the ground structure of the terminator through the receptacle. The reader skilled in the art may also readily appreciate modifications to the structure of the receptacle as hereinabove set forth. It should be understood, however, that such modifications are to be construed as lying within the scope of the present invention as set forth in the appended claims.

What is claimed is:

1. In a terminator for multiple electrical conductors of the type having a metallic ground structure formed of a baseplate with a plurality of upstanding walls thereon cooperating to define a predetermined number of channels arranged in side-by-side relationship across the ground structure, the baseplate having a forward edge thereon;

an insulated support structure having a plurality of forwardly extending fingers thereon, the number of fingers corresponding to the number of channels on the baseplate, each of the fingers being received in one of the channels; and at least one electrical contact element being disposed on each of the fingers, each of the contact elements being connectable to one of the conductors so that, in use, the ground structure is connectable to a predetermined electrical potential whereby the electrical contact elements are electrically isolated from each other;

the improvement comprising;

at least one grounding contact projecting forwardly past the forward edge of the baseplate of the metallic ground structure.

2. The terminator of claim 1 wherein one of the fingers has a latch disposed on a surface thereof and wherein the baseplate has a notch therein, the notch being sized to receive the latch thereby to secure the finger to the baseplate.

3. The terminator of claim 1 wherein the grounding contact is connected to the baseplate.

4. The terminator of claim 1 wherein the grounding contact has a planar shank portion with a tang offset therefrom and wherein the baseplate has a first and a second surface thereon and a recessed tongue formed therein, the recessed tongue being defined by a full groove extending across one surface of the plate and a partial groove defined across the other surface of the plate, the planar shank portion of the grounding contact being receivable in the full groove and the tang being receivable in the partial groove.

5. The terminator of claim 1 wherein one of the walls has a predetermined dimension and wherein the insulated support structure has a slot therein, the slot being sized to closely accept the wall such that the insulated support structure is precisely located with respect to the baseplate, the one wall having a tapered guide portion thereon.

6. The terminator of claim 1 wherein the forward edge of the baseplate is chamfered at a predetermined angle.

7. The terminator of claim 1 adapted for use with receptacle having a central plate with a leading edge thereon, wherein the leading edge of the central plate is chamfered at a predetermined angle, and wherein the forward edge of the baseplate of the ground structure is chamfered at a corresponding angle so that the forward edge of the ground structure and the leading edge of the central plate lie parallel to each other.

*8. An electrical connector system, comprising:*

*a first connector having two arrays of contact elements and a first conductive plate separating said two arrays of contact elements;*

*a second connector having two arrays of contact elements and a second conductive plate separating said two arrays of contact elements; and*

*said second connector adapted to mate with said first connector so that said contact elements of said first and second connectors form electrical connections therebetween and so that said first and second conductive plates are brought to within a predetermined distance from each other thereby reducing crosstalk between adjacent contact elements.*

*9. The system of claim 8, wherein said predetermined distance is less than or equal to about 0.005 inches.*

*10. The system of claim 8, wherein said first connector is a receptacle and said second connector is a plug.*

*11. The system of claim 8, wherein said first connector comprises a conductive frame with said first conductive plate being integrally connected thereto.*

*12. The system of claim 8, wherein said second connector comprises a conductive frame with said second conductive plate being integrally connected thereto.*

*13. The system of claim 8, wherein said first connector is a receptacle comprising:*

*an insulative contact block for supporting at least a portion of an array of said contact elements;*

*a conductive frame in which said insulative contact block is received; and*

*said first conductive plate being integrally formed with said conductive frame.*

*14. The system of claim 13, wherein said conductive frame forms an elongated shell comprising an upper crossbar and a lower cross bar, said first conductive plate being centrally disposed between said upper and lower crossbars and being disposed in a plane substantially parallel with said upper and lower crossbars.*

*15. The system of claim 14, wherein each of said two arrays of contact elements extend from said insulative contact block in a plane parallel to said crossbars such that one array of contacts is disposed between said upper crossbar and said conductive plate and said other array of contact elements is disposed between said lower crossbar and said conductive plate, said one array of contact elements being deflectable in the direction toward said upper crossbar and said other array of contact elements being deflectable toward said lower crossbar.*

*16. The system of claim 15, wherein said receptacle further comprises:*

*an insulative housing being received in said conductive frame and for receiving said insulative contact block;*

*said housing having a plurality of fingers forming spaces therebetween and a retaining member connecting said fingers; and*

*each said contact element extending from said contact block into a corresponding one of said spaces such that the extended ends of each said contact element is retained by said retaining member.*

*17. The system of claim 15, wherein said receptacle further comprises:*

*an insulative retaining member connected to said conductive frame proximate to said upper and said lower crossbars, said insulative retaining member having a plurality of openings for receiving the ends of said contact elements and retaining said ends therein.*

*18. The system of claim 8, wherein said second connector is a plug and wherein said conductive frame comprises:*

*an upper shroud;*

*a lower shroud integrally formed with said upper shroud; and*

*said second conductive plate integrally formed with said upper and lower shrouds and disposed therebetween in a plane substantially parallel to both upper and lower shrouds.*

*19. The system of claim 18, wherein each shroud has at least one cut out portion.*

*20. A method of electrically connecting multiple electrical conductors, comprising the steps of:*

*connecting a first connector having two arrays of contact elements separated by a first conductive plate to a first set of conductors;*

*connecting a second connector having two arrays of contact elements separated by a second conductive plate to a second set of conductors;*

*mating said first and second connectors so that said contact elements of said first and second connectors form electrical connections therebetween and so that said first and second conductive plates are brought within a predetermined distance from each other thereby reducing crosstalk between adjacent contact elements.*

*21. The method of claim 20, wherein said predetermined distance is less than or equal to about 0.005 inches.*

*22. The method of claim 20, wherein said first connector comprises a conductive frame with said first conductive plate being integrally connected thereto.*

*23. The method of claim 20, wherein said second connector comprises a conductive frame with said second conductive plate being integrally connected thereto.*

*24. The method of claim 20 wherein said first and second connectors comprise respective first and second conductive frames, said first conductive frame comprises parallel upper and lower crossbars integrally formed together with said conductive plate centrally disposed between said upper and lower crossbars and in parallel with said crossbars, said upper crossbar having at least one raised section formed therein and said lower crossbar having at least one sunken section formed therein,*

*said second conductive frame comprises parallel upper and lower shrouds integrally formed together with said second conductive plate centrally disposed between said upper and lower shrouds and in parallel with said upper and lower shrouds, wherein each shroud has at least one cut out portion corresponding to said at least one raised section and said at least one sunken section, wherein the step of mating the connectors comprises the steps of:*

*aligning said cut out portions of said upper crossbar with said raised sections; and*

*aligning said cut out portions of said lower crossbar with said sunken sections; and*

*slidably forcing said second conductive frame onto said first conductive frame.*

* * * * *